United States Patent
Ahn et al.

(10) Patent No.: US 7,845,863 B2
(45) Date of Patent: Dec. 7, 2010

(54) IMAGE PHOTOGRAPHY APPARATUS

(75) Inventors: Kyoung-jin Ahn, Suwon-si (KR); Yeon-moo Chung, Seoul (KR); In-shik Kim, Seoul (KR)

(73) Assignee: Samsung Electronics Co., Ltd, Suwon-si (KR)

( * ) Notice: Subject to any disclaimer, the term of this patent is extended or adjusted under 35 U.S.C. 154(b) by 457 days.

(21) Appl. No.: 11/853,408

(22) Filed: Sep. 11, 2007

(65) Prior Publication Data

US 2008/0063392 A1 Mar. 13, 2008

(30) Foreign Application Priority Data

Sep. 12, 2006 (KR) .................. 10-2006-0088169
Jul. 4, 2007 (KR) .................. 10-2007-0067061

(51) Int. Cl.
*G03B 17/00* (2006.01)
*H04N 5/225* (2006.01)

(52) U.S. Cl. ..................... 396/423; 348/376

(58) Field of Classification Search ............. 396/423; 348/376

See application file for complete search history.

(56) References Cited

U.S. PATENT DOCUMENTS

| 5,946,512 | A  | * | 8/1999  | Lavine et al. ............... 396/423 |
| 6,942,400 | B2 | * | 9/2005  | Shibayama ................. 396/419 |
| 7,192,204 | B2 | * | 3/2007  | Koide et al. ................. 396/423 |
| 7,619,682 | B2 | * | 11/2009 | Igarashi ..................... 348/373 |
| 2005/0062880 | A1 | * | 3/2005 | Kojima et al. ............... 348/373 |
| 2008/0063393 | A1 | * | 3/2008 | Chung et al. ............... 396/535 |
| 2008/0122947 | A1 | * | 5/2008 | Yang ..................... 348/231.99 |
| 2008/0159731 | A1 | * | 7/2008 | Kim et al. ................... 396/423 |

FOREIGN PATENT DOCUMENTS

| JP | 1-38147   | 3/1989 |
| JP | 5-83608   | 4/1993 |
| JP | 2005-94665 | 4/2005 |

* cited by examiner

*Primary Examiner*—Rodney E Fuller
(74) *Attorney, Agent, or Firm*—Stanzione & Kim LLP

(57) ABSTRACT

An image photography apparatus enabling a user to capture an object by freely changing a position of the hand according to an angle shot while gripping the image photography apparatus. The image photography apparatus includes a main body and a rotation unit rotatably installed on the main body. The rotation unit includes a rotation part, a connection part rotatably connecting the rotation part to one side of the main body, and a grip band coupled to the rotation part.

59 Claims, 19 Drawing Sheets

IMAGE PHOTOGRAPHY APPARATUS

CROSS-REFERENCE TO RELATED APPLICATIONS

This application claims priority under 35 U.S.C. §119 (a) from Korean Patent Application Nos. 10-2006-0088169, filed on Sep. 12, 2006, and 10-2007-0067061, filed on Jul. 4, 2007 in the Korean Intellectual Property Office, the disclosure of which is hereby incorporated in its entirety by reference.

BACKGROUND OF THE INVENTION

1. Field of the Invention

The present general inventive concept relates to an image photography apparatus.

2. Description of the Related Art

Referring to FIGS. 1 through 2B, the figures illustrate a general image photography apparatus which comprises a hand grip 20 securely fixed on one side of a main body 10 to wrap the back of a hand 1 so that the image photography apparatus can be easily held in the hand for the image capturing.

It is known that such prior art general image photography apparatus typically require a user to change hand positions when holding the apparatus for high angle shots and low angle shots. In order to capture high angle shots using the prior art general image photography apparatus, a user is typically required to hold the main body 10 by putting the hand 1 into the hand grip 20 to wrap the back of the hand as illustrated in FIG. 2A. However, when changing from high angle shots to low angle shots, the user is typically required to remove the hand 1 from the hand grip 20 and then re-grip the main body 10 of the image photography apparatus as illustrated in FIG. 2B. Conversely, when changing from low angle shots to high angle shots, the user is again required to remove the hand 1 from the main body 10 and then re-grip the image photography apparatus with the pose illustrated in FIG. 2A. As a result, it is difficult to maintain continuous image capturing when the user is transitioning between high and low angle shots because the user is required to change the hand grip to capture low and high angle shots. Another disadvantage of such prior art apparatus is that when the user is transitioning between high and low angle shots, the close contact between the main body 10 and the hand 1 deteriorates as the user changes hand positions. Furthermore, when the image photography apparatus is not in use, the hand grip 20 typically dangles from the main body 10, thus causing uncomfortable carrying of the image photography apparatus.

SUMMARY OF THE INVENTION

The present general inventive concept provides an image photography apparatus enabling a user to capture images by freely changing the position of a hand while holding the image photography apparatus according to his/her intended angle shot.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing an image photography apparatus including a main body; and a rotation unit rotatably installed on the main body.

The rotation unit may comprise a first member protruding and rotatably installed on one side of the main body; and a second member fixed to the first member substantially perpendicularly thereto.

The rotation unit may comprise a rotation plate rotatably installed on one side of the main body; a first member rotatably hinged to the rotation plate; and a second member hinged to the first member to rotate substantially perpendicularly thereto.

A length of the first member may be adjustable lengthwise.

A disc cover having an open and closed position may be installed on one side of the main body for inserting and extracting a recording medium, and the rotation unit may be installed to the disc cover.

The rotation unit may further comprise a rotation part installed to the disc cover; a connection part rotatably connecting the rotation part to the disc cover; and a grip band coupled to the rotation part.

The rotation part may be rotatable between at least two positions spaced apart by approximately 0~140°.

A rotational center of the rotation part may be eccentric to a user who holds the main body so as not to coincide with a geometrical center of the rotation part.

The rotational center of the rotation part may lie between a geometrical center of the main body and the geometrical center of the rotation part.

The rotational center of the rotation part may be spaced apart from a rear side of the main body, which faces the user, to a front side of the main body by approximately 45~55 mm.

The rotation part may comprise a rotation member; and first and second rotation casings to wrap the rotation member.

A connection part may comprise a first connecting member to connect the rotation part to the main body; and a second connecting member to connect the rotation member to the first connecting member.

A mounting hole to mount the first connecting member may be formed on the second rotation casing.

A reinforcing bracket connected to the first connecting member may be installed on an inner side of the disc cover.

The rotation unit may comprise an elastic member installed between the rotation member and the first connecting member to generate a friction torque.

The rotation unit may further comprise a sub-member installed between the first connecting member and the elastic member to minimize abrasion of the first connecting member due to elasticity of the elastic member.

A plurality of positioning grooves may be formed on the rotation member to correspond to the at least two positions of the rotation member, and a positioning protrusion inserted into the positioning grooves may protrude from the elastic member.

An interval of the positioning grooves may be approximately 140°.

The positioning grooves may have different radiuses as measured from the rotational center of the rotation member.

The positioning grooves may comprise at least one pair of first positioning grooves spaced apart at intervals of approximately 140°; and at least one pair of second positioning grooves spaced apart from the first positioning grooves by approximately 10°.

The rotation unit may comprise a stopper unit to restrict a rotation range of the rotation part with respect to the main body.

The stopper unit may comprise a stopper rail disposed in the second rotation casing with a rotational radius of approximately 140° based on the rotational center of the rotation part;

and a stopper protrusion protruding from the first connecting member to be inserted into the stopper rail.

The grip band may be installed on the first rotation casing.

The main body may comprise a button unit including first and second button parts to input the same manipulation signal at different places.

A holding part to guide the holding of the main body may be formed on an upper side of the main body.

A display part having an open and closed position for displaying a video captured by the lens part may be installed on another side of the main body.

The foregoing and/or other aspects and utilities of the present general inventive concept may also be achieved by providing an image photography apparatus including a main body comprising a lens part or lens unit for capturing an object, and a disc loader for recording the captured image from the lens part; a disc cover having an open and closed position installed on one side of the main body to cover the disc loader; and a rotation unit may be installed on the disc cover to rotate with respect to the main body.

The foregoing and/or other aspects and utilities of the present general inventive concept may also be achieved by providing an image photography apparatus including a main body comprising a lens part installed on a front side of the main body to capture an object, and a recording medium driving part to drive a recording medium so as to record a video captured by the lens part; a display part installed on one side of the main body to display the video; a recording medium cover having an open and closed position installed on another side of the main body; and a rotation member rotatably installed on the recording medium cover.

A rotational center of the rotation member may be eccentric from a geometrical center of the main body toward a rear side of the main body.

A rotational center of the rotation member may be eccentric from a geometrical center of the recording medium cover toward a rear side of the main body.

The rotation member may be rotatable between a first position for a high angle shot and a second position for a low angle shot.

A rotation range of the first position may be approximately 0~20°, and a rotation range of the second position may be approximately 130~170°.

A holding part for guiding the holding of the main body may be formed in an upper side of the main body.

The holding part may be inclined at a predetermined angle.

The rotation unit may be folded toward the main body to prevent the rotation unit from dangling from the main body.

The foregoing and/or other aspects and utilities of the present general inventive concept may also be achieved by providing an image photography apparatus comprising a main body having a recording unit and a lens unit, a rotation unit rotatably disposed on the main body, and a grip extended from the rotation unit to rotate with respect to the main body.

The foregoing and/or other aspects and utilities of the present general inventive concept may also be achieved by providing an image photography apparatus comprising a main body, and a rotation unit rotatably installed on the main body and formed with a hand grip to rotate with respect to the main body, wherein the rotation unit may be rotated by a user's hand between a first position to capture high angle shots and a second position to capture low angle shots without removing the user's hand from the rotation unit.

The foregoing and/or other aspects and utilities of the present general inventive concept may also be achieved by providing a method of capturing images with an image photography apparatus having a rotation unit rotatably installed to a main body of the image photography apparatus, the method comprising gripping the rotation unit by a user's hand in a first position to capture high angle images, and rotating the rotation unit to a second position to capture low angle images without removing the user's hand from the rotation unit.

The main body may comprise a button unit including first and second button parts disposed on different sides of the main body, each button part being configured to input the same manipulation signals to the image photography apparatus, wherein the user's hand selectively operates the button unit in either the first or second position to input the same manipulation signals to the image photography apparatus from the first and second positions.

The first and second button parts may enable the user to selectively control modes of operation of the image photography apparatus from either the first or second position.

The foregoing and/or other aspects and utilities of the present general inventive concept may also be achieved by providing an image photography apparatus comprising a main body, a rotation unit rotatably installed on the main body and formed with a hand grip to rotate with respect to the main body, a button unit including first and second button parts disposed on different sides of the main body, each button part being configured to input the same manipulation signals to the image photography apparatus, wherein the rotation unit may be rotated by a user's hand between a first position and a second position without removing the user's hand from the rotation unit, and wherein the user's hand selectively operates the button unit in either the first or second position to input the same manipulation signals to the image photography apparatus from the first and second positions.

BRIEF DESCRIPTION OF THE DRAWINGS

These and/or other aspects and utilities of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
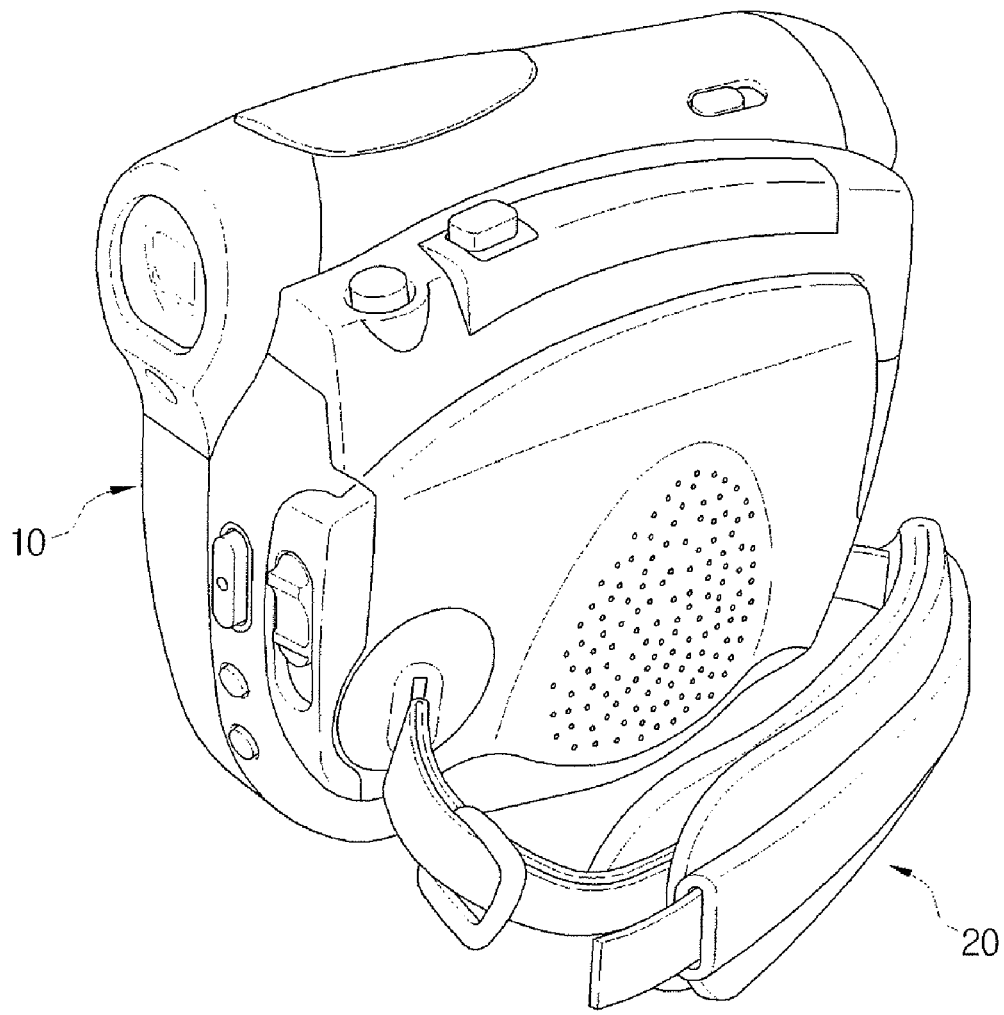
FIG. 1 is a simplified perspective view illustrating a general image photography apparatus.
Figure 2A:
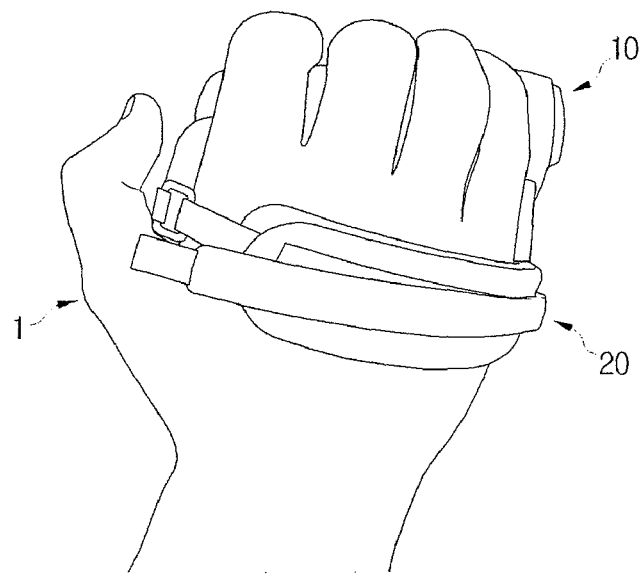
FIGS. 2A and 2B are simplified views illustrating a grip position according to an angle shot of the general image photography apparatus.
Figure 2B:
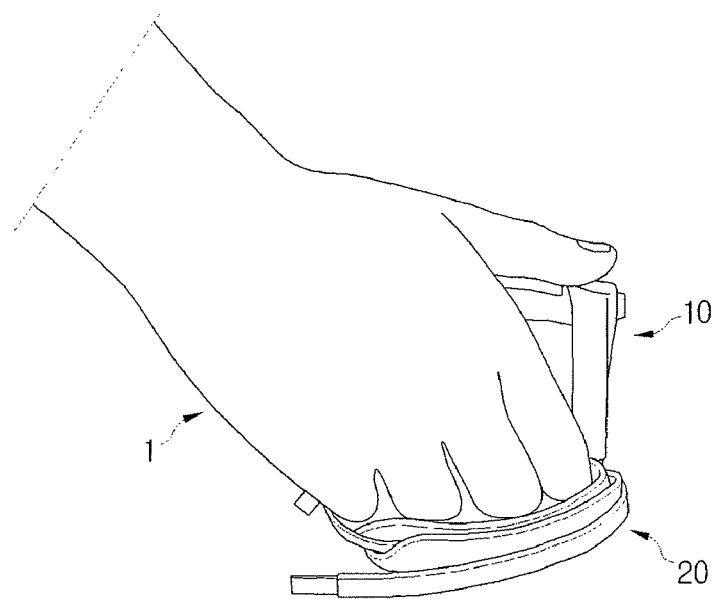

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIGS. 3A through 3D are simplified perspective views of an image photography apparatus according to a first exemplary embodiment of the present general inventive concept.

Referring to FIGS. 3A through 3D, the image photography apparatus comprises a main body 100 and a rotation unit 200 rotatably installed to the main body 100.

The main body 100 typically comprises a camcorder, a video camera, or a still camera, although the present general inventive concept is not limited thereto. For example, the main body 100 may also comprise another known or later developed image photography apparatus such as a camera phone or other image photography device without departing from the scope of the present general inventive concept.

The main body 100 may include a lens unit and a recording unit to store an image on a recording medium, such as a disc, tape or semiconductor memory. The image can be captured by the lens unit or received from an external drive through a terminal of the main body 100.

The rotation unit 200 comprises a rotation plate 210, a first member 220, and a second member 230.

The rotation plate 210 is rotatably installed on one side of the main body 100. The rotation plate 210 comprises a rotation shaft (not illustrated) which may be coupled to the main body 100. The rotation shaft comprises a gear structure (not illustrated) such that the rotation plate 210 rotates stepwise at predetermined angular intervals with respect to the main body 100. The rotation plate 210 may be shaped in the form of a thin circular plate or a thin polygonal plate, but it should be understood the present general inventive concept is not limited to such shapes.

Figure 3A:
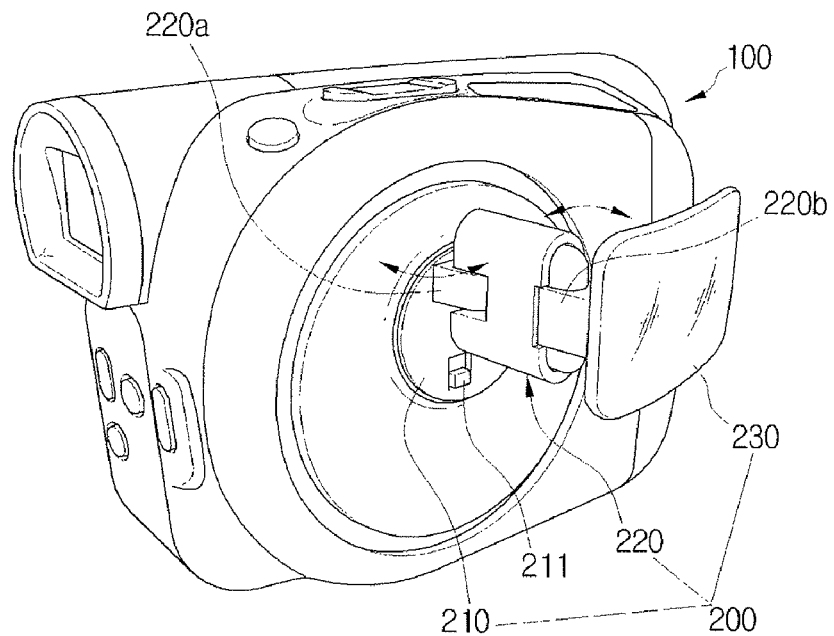
FIGS. 3A through 3D are simplified perspective views illustrating an image photography apparatus according to a first exemplary embodiment of the present general inventive concept.
Figure 3B:
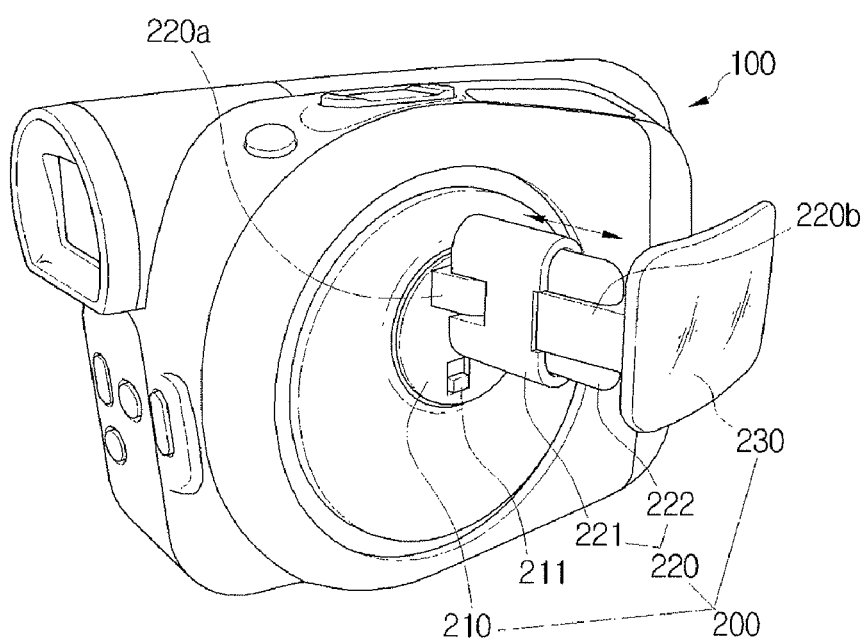
Figure 3C:
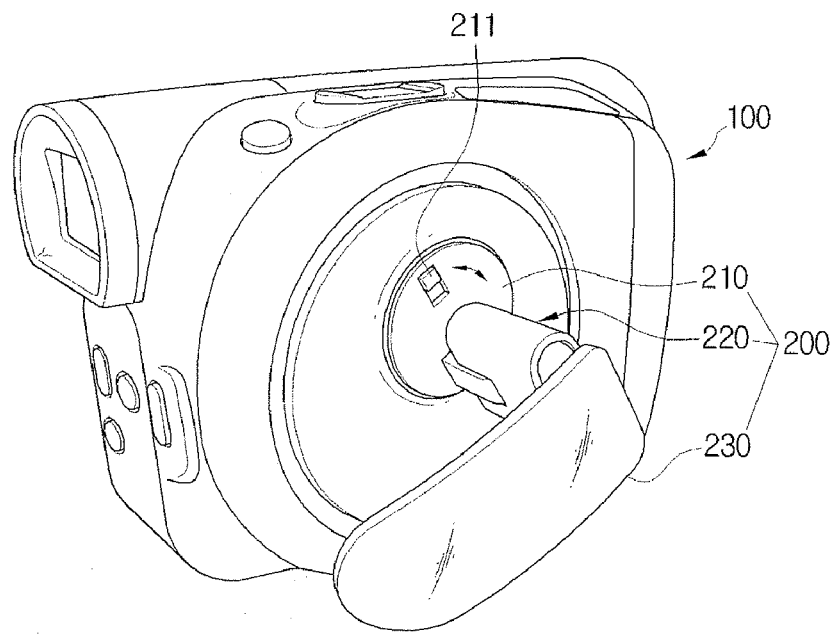

As illustrated in FIGS. 3A through 3C, one end of the first member 220 may be connected to the rotation plate 210 with a hinge 220a so that the first member 220 may be hinged and eccentrically tilted in relation to the rotation shaft of the rotation plate 210. The first member 220 may be formed as a circular, oval, or polygonal rod having a diameter wide enough to accommodate insertion between two fingers, for example, a forefinger 1a and a middle finger 1b (see FIG. 4A). The length of the first member 220 may be adjusted lengthwise. For example, the first member 220 comprises at least two steps 221 and 222 to insert and extract the first member 220 to adjust the length length of the first member 220 in a manner similar to the adjustment of a telescoping-type antenna. It is understood that the length of the first member 220 may be fixed after the length of the first member 220 has been adjusted. For example, once the first member 220 is pulled out from the main body 100 to enable a user to grip the image photography apparatus with the fingers, the first member 220 may be automatically locked by a locker (not illustrated) disposed in the main body 100 to maintain the first member 220 in a spread or upright position. Then, when a lock release button 211 is pressed, the lock may be released and the first member 220 may be folded toward the main body 100 as illustrated in FIG. 3D.

Figure 4A:
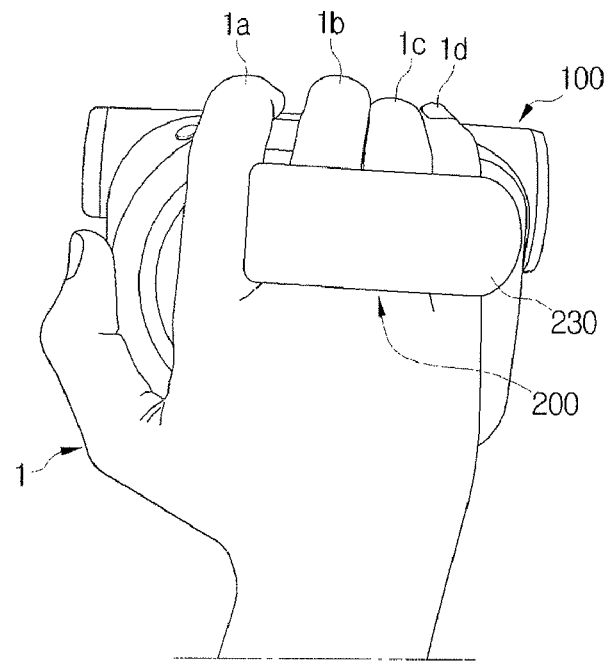
FIGS. 4A and 4B are simplified views illustrating a grip position of a rotation unit according to an angle shot of the image photography apparatus according to the first exemplary embodiment of the present general inventive concept.

Referring to FIG. 4A, one end of the second member 230 may be connected to the other end of the first member 220 using a hinge 220b to rotate the second member 230 substantially perpendicularly thereto, i.e. relative to the first member 220. The second member 230 may be formed as a plate having an inner surface configured to wrap the middle finger 1b, the ring finer 1c, and a little finger 1d (see FIG. 4A). The second member 230 may be formed in a curved surface having a certain internal curvature. The inside of the second member 230 may be formed of steel or other suitable material having a tension and strength such that the fingers may be received in the main body 100, and the inner surface of the second member 230 may be formed of a rubber or other elastic material to prevent the fingers from slipping and to make the second member 230 more comfortable to the grip touch of the user's fingers.

Figure 3D:
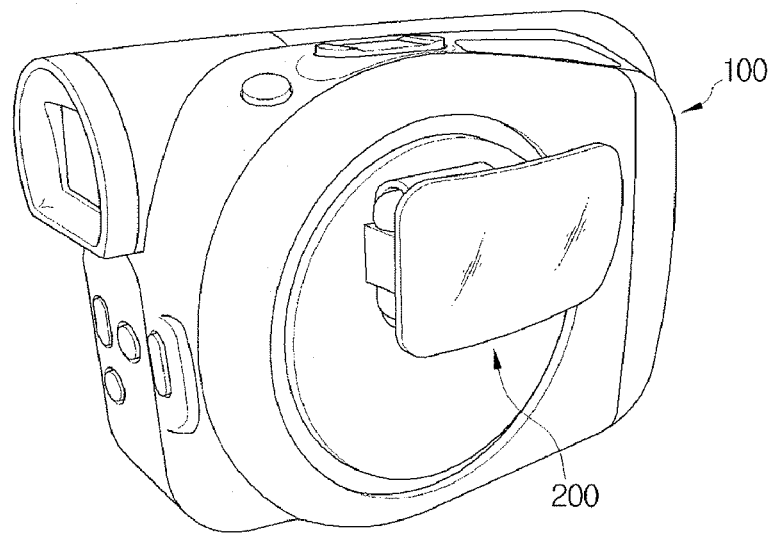

In the present exemplary embodiment, when the image photography apparatus is not in use, the first member 220 and second member 230 of the rotation unit 220 may be folded to one side of the main body 100 as shown in FIG. 3D. During use of the image photography apparatus, the first member 220 and the second member 230 of the rotation unit 220 may be rotated and unfolded as illustrated in FIGS. 3A through 3C.

FIG. 4A illustrates an exemplary hand grip for capturing high angle shots in accordance with the present general inventive concept. As illustrated in FIG. 4A, a user holds the main body 100 by inserting the first member 220 between the forefinger 1a and the middle finger 1b and wrapping the middle finger 1b, the ring finger 1c, and the little finger 1d within the second member 230. To enhance contact between the fingers and the main body 100, the length of the first member 220 may be adjusted and fixed according to the thickness of the fingers.

Figure 4B:
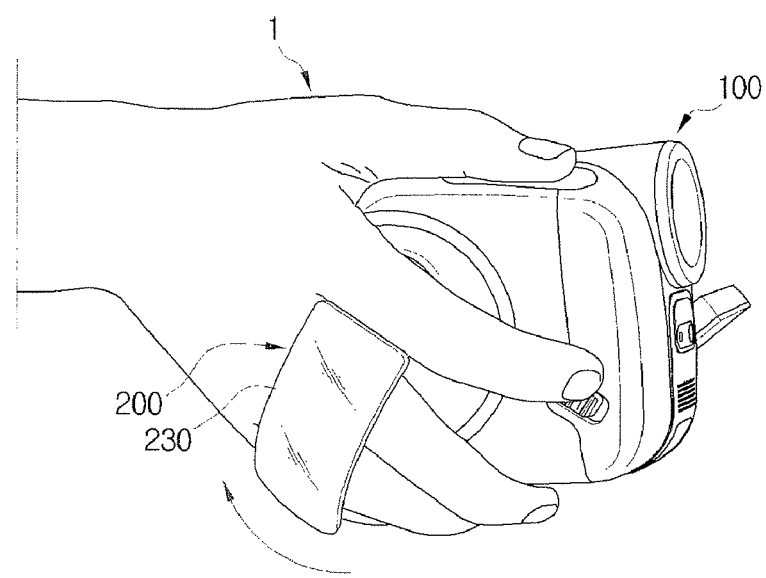

FIG. 4B illustrates an exemplary hand grip for capturing low angle shots in accordance with the present general inventive concept. As illustrated in FIG. 4B, the rotation unit 200 may be rotated while the fingers are still holding the image photography apparatus. That is, it is not necessary for the user to remove the hand or fingers from the rotation unit 200 when the user transitions the image photography apparatus between high and low angle shots. Likewise, to change from low angle shots to high angle shots, the rotation unit 200 may be rotated without changing the user's grip while the user's fingers are still holding the image photography apparatus. In this way, the user can capture images by freely moving the hand 1 while holding the image photography apparatus according to the intended angle shot.

As described above, when the image photography apparatus is not in use, the rotation unit 200 may be folded to prevent the rotation unit 200 from dangling from the main body 100.

Figure 5:
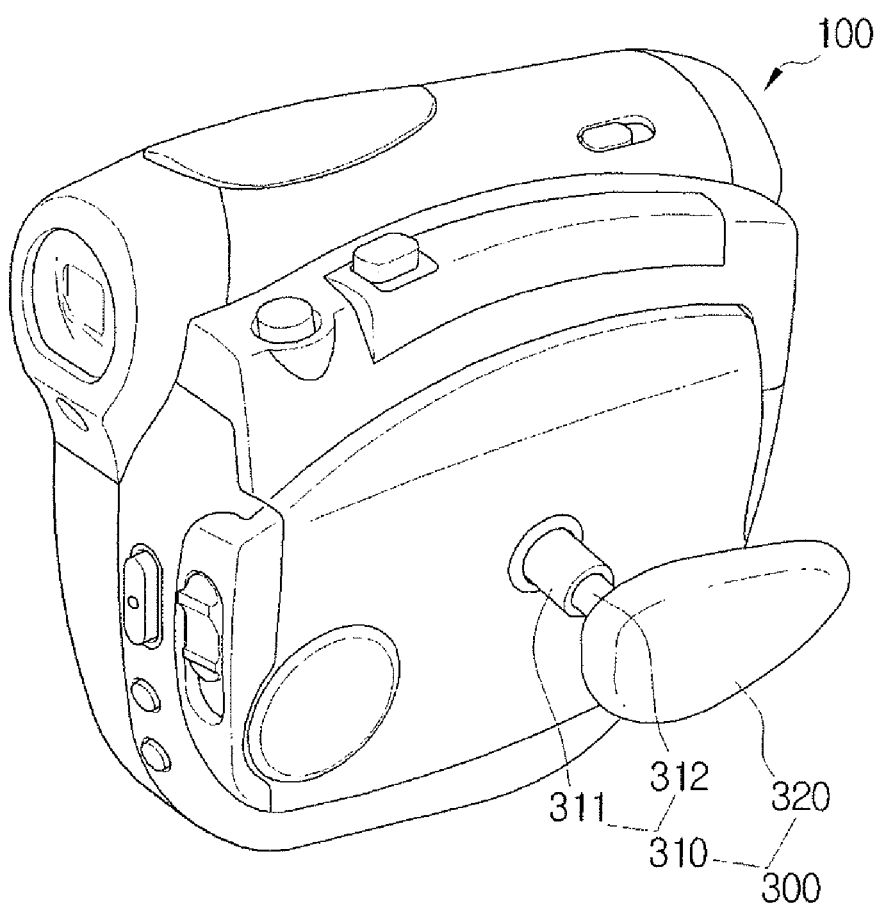
FIG. 5 is a simplified perspective view illustrating an image photography apparatus according to a second exemplary embodiment of the present general inventive concept.

FIG. 5 is a perspective view illustrating an image photography apparatus according to a second exemplary embodiment of the present general inventive concept.

Referring to FIG. 5, the image photography apparatus comprises a main body 100 and a rotation unit 300 rotatably installed on the main body 100.

The rotation unit 300 comprises a first member 310 and a second member 320.

The first member 310 may be a rotation shaft member rotatably engaged with one side of the main body 100. The first member 310 protrudes from one side of the main body 100. The first member 310 may be formed as a circular, oval, or polygonal rod having a diameter wide enough to accommodate insertion between two fingers, for example, the forefinger and the middle finger. The length of the first member 310 may be adjusted lengthwise. For example, the first member 310 comprises at least two steps 311 and 312 to insert and extract the first member 310 to adjust the length of the first member 310 similar to the manner of the adjustment of a telescoping-type antenna. It is understood the length of the first member 310 may be fixed after the length adjustment as discussed above with respect to the first exemplary embodiment of the present general inventive concept.

One end of the second member 320 may be fixed to one end of the first member 310 roughly perpendicularly thereto. The second member 320 may be configured as a plate having an inner surface to wrap the middle finger, the ring finger, and a little finger. The second member 320 may be formed as a curved surface having a certain internal curvature. The inside of the second member 320 may be formed of steel or other suitable material having a tension and strength such that the fingers may be received in the main body 100, and the inner surface of the second member 320 may be formed of a rubber or other elastic material to prevent the fingers from slipping and to make the second member 320 more comfortable to the grip touch of the fingers.

When the user changes between high angle shots and low angle shots, the image photography apparatus according to the second exemplary embodiment of the present general inventive concept operates similar to the first exemplary embodiment of the present general inventive concept described above. Thus, further explanation shall be omitted.

Figure 6:
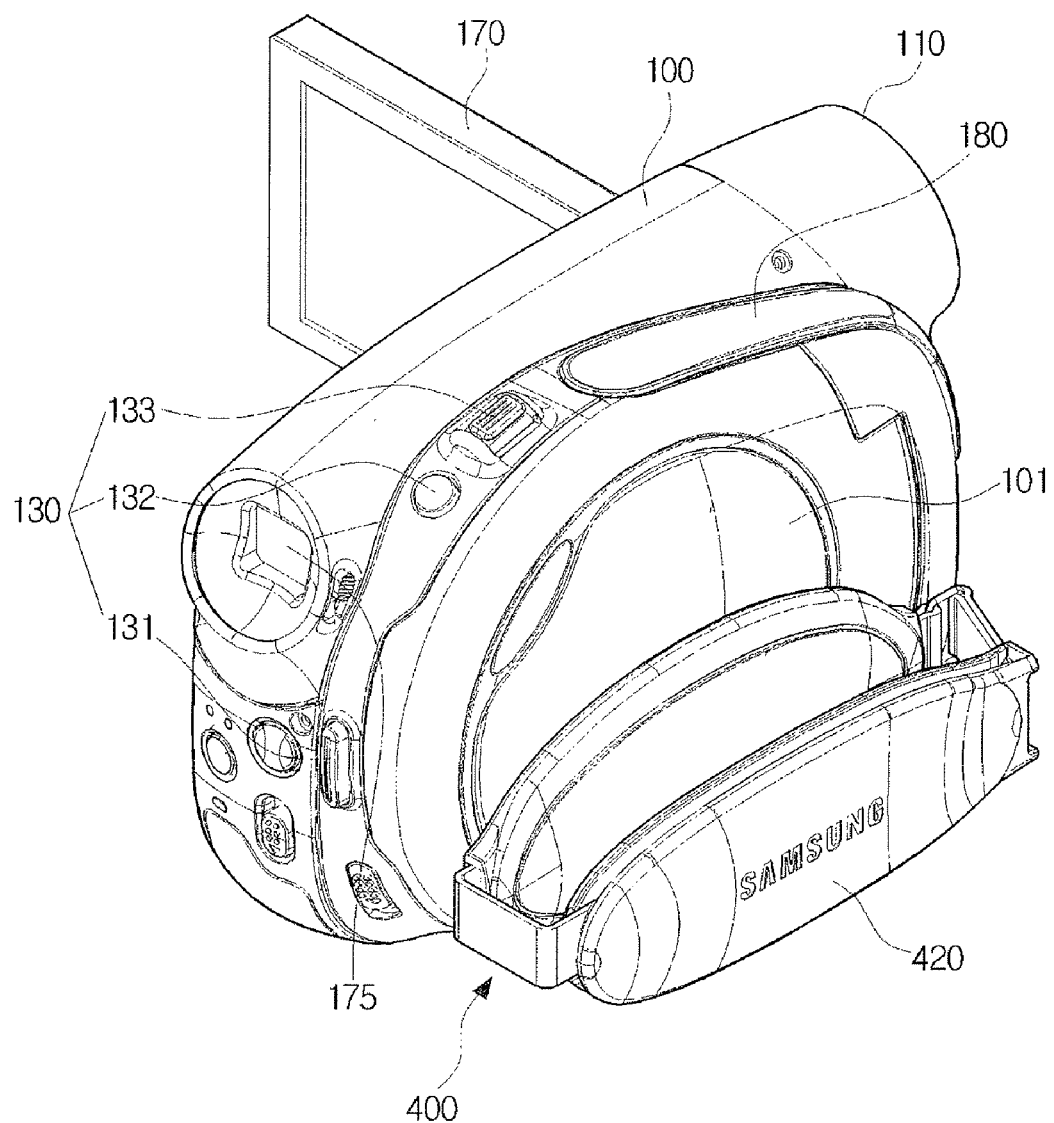
FIG. 6 is a simplified perspective view illustrating an image photography apparatus according to a third exemplary embodiment of the present general inventive concept.

FIG. 6 is a perspective view illustrating an image photography apparatus according to a third exemplary embodiment of the present general inventive concept.

Referring to FIG. 6, the image photography apparatus comprises a main body 100 and a rotation unit 400.

The main body 100 comprises a lens part 110 for capturing an object, and a button unit 120 (refer to FIGS. 7A, 7B and 13) for inputting a manipulation signal. The video captured by the lens part 110 is reproduced by a display part 170 which is installed on the main body 100. The user can move the display part 170 between open and closed positions relative to the main body 100.

Figure 7A:
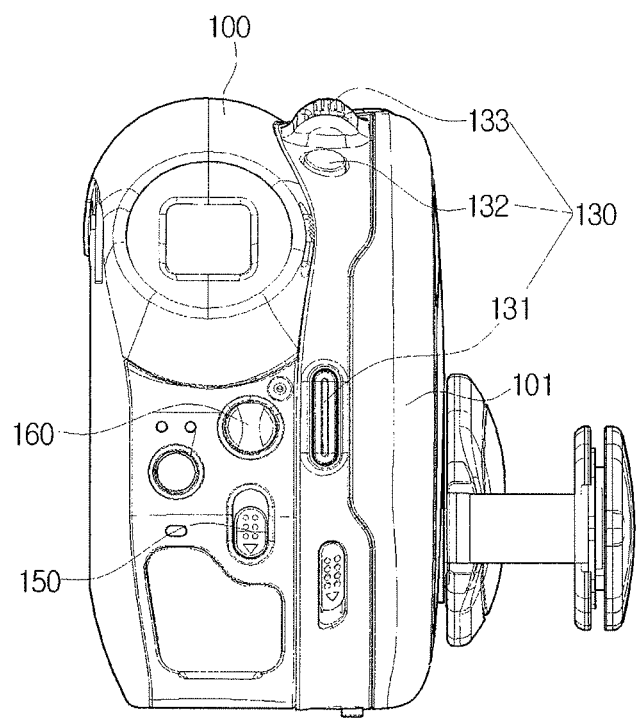
FIGS. 7A, 7B and 7C are simplified plane views illustrating front side, rear side, and upper side of the image photography apparatus of FIG. 6.
Figure 7B:
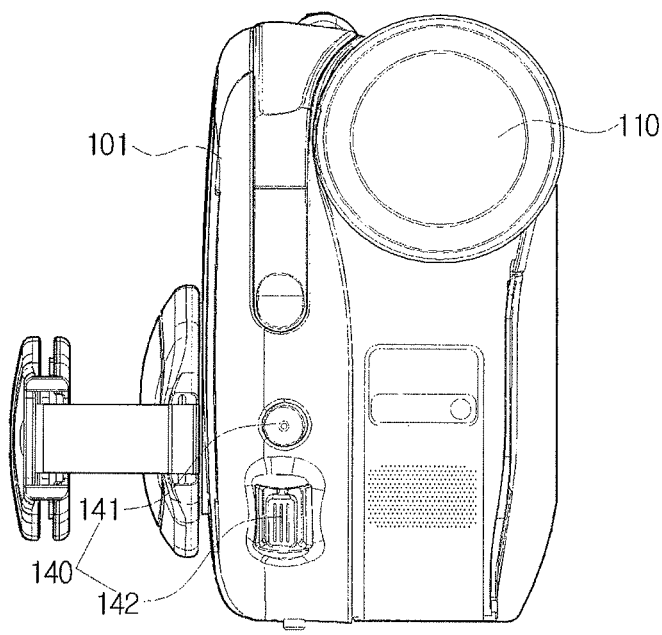
Figure 13:
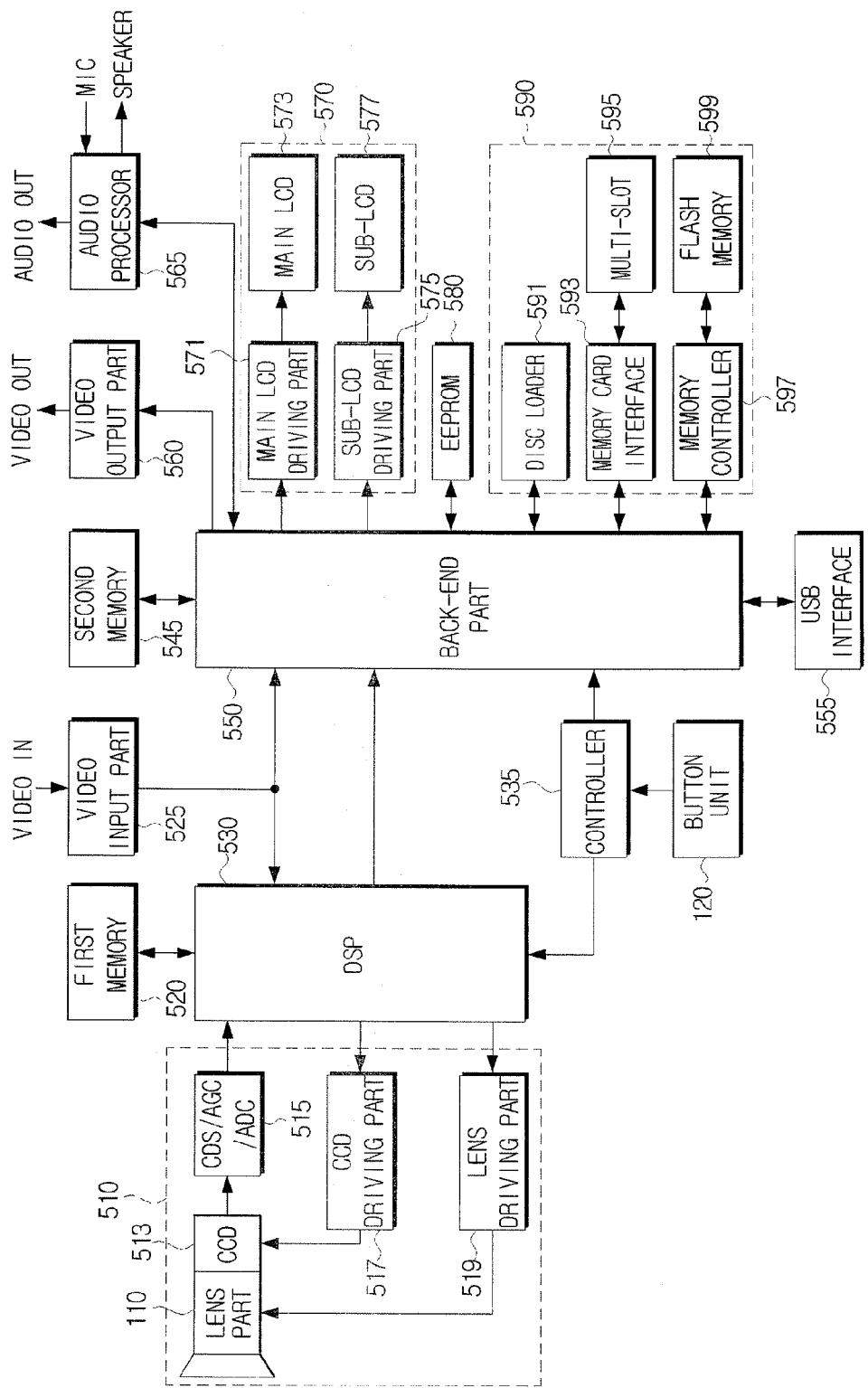
FIG. 13 is an internal block diagram illustrating the image photography apparatus according to an exemplary embodiment of the present general inventive concept.

Referring to FIGS. 7A, 7B and 13, the button unit 120 comprises first and second button parts 130 and 140 to input manipulation signals therefrom.

Figure 7C:
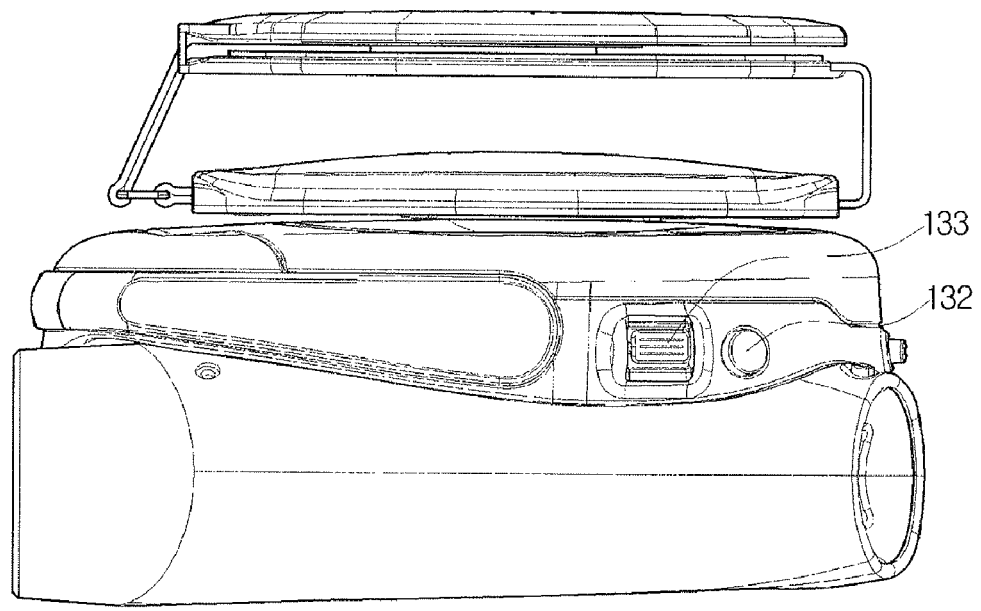

The first button part 130 comprises a video capturing button 131 formed in a rear side of the main body, that is, in the rear side opposing the front side where the lens part 110 is installed. The first button part 130 also comprises a still image capturing button 132 and a first zoom button 133 formed in an upper side of the main body 100 as shown in FIGS. 7A and 7C.

The second button part 140 comprises a video/still image capturing button 141 and a second zoom button 142 disposed in the front side of the main body 100 where the lens part 110 is installed as illustrated in FIG. 7B.

In addition to the first and second button parts 130 and 140, the button unit 120 also comprises a plurality of buttons for various manipulation signals, for example, a power button 150 to switch between a power on and power off condition, and a mode change button 160 to change the modes of operation as illustrated FIGS. 7A, 7B and 13. The specific modes of operation provided in the exemplary embodiments of the present general inventive concept will be described in more detail below.

The main body 100 also comprises a power supply (not illustrated) therein for receiving power to recharge the main body 100 and/or to provide a driving power to the main body 100.

The construction of the main body 100 will also be explained in more detail below with reference to FIG. 13.

The rotation unit 400 may be rotatably installed to a disc cover 101, which may in turn be disposed on one side of the main body 100. The disc cover 101 comprises open and closed positions to receive and extract an external recording medium, for example a disc. The disc may be a Compact Disk (CD), Digital Versatile Disk (DVD), Blu-ray Disk (BD), High Definition (HD)-DVD, or other known or later developed recording media. The rotation unit 400 may be rotated between at least two positions spaced apart by approximately 0~140° apart.

Figure 11A:
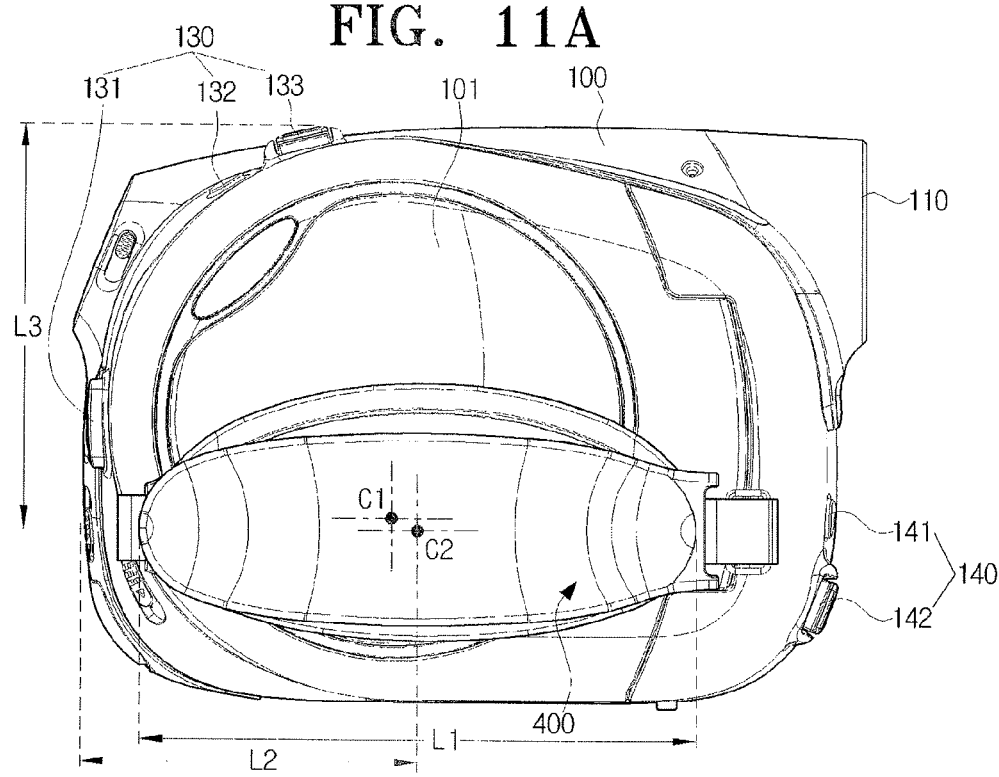
FIGS. 11A, 11B and 11C are simplified side views illustrating the rotation status of the rotation unit with respect to the main body.

In the third exemplary embodiment of the present general inventive concept, the rotation unit 400 may be rotatable between a first position where the user captures images of high-angle objects, and a second position where the user captures images of low-angle objects. FIG. 11A illustrates the rotation unit 400 rotated to the first position to capture high angle shots, and FIG. 11C illustrates the rotation unit 400 rotated to the second position to capture low angle shots.

The rotation angle between the first and second positions of the rotation unit 400 may be approximately 140 degrees, although different rotation angles may be chosen without departing from the broader scope of the present general inventive concept. In the third exemplary embodiment of the present general inventive concept, the rotation range of the first position is approximately 0~10° and the rotation range of the second position is approximately 130~140°. The rotation range of the rotation unit 400 takes into account the gripping comfort of the user's hand while holding the rotation unit 400, and the user's ability to manipulate the button unit 120 while the user holds the main body 100 by gripping the rotation unit 400.

As discussed above, in this exemplary embodiment of the present general inventive concept, the rotation range of the first and second positions may be approximately 0~10° and 130~140° respectively, but the present general inventive concept is not limited these ranges. For example, it is understood that the first and second positions may have many different rotation ranges, such as between the ranges of 0~20° and 130~170°.

Figure 11B:
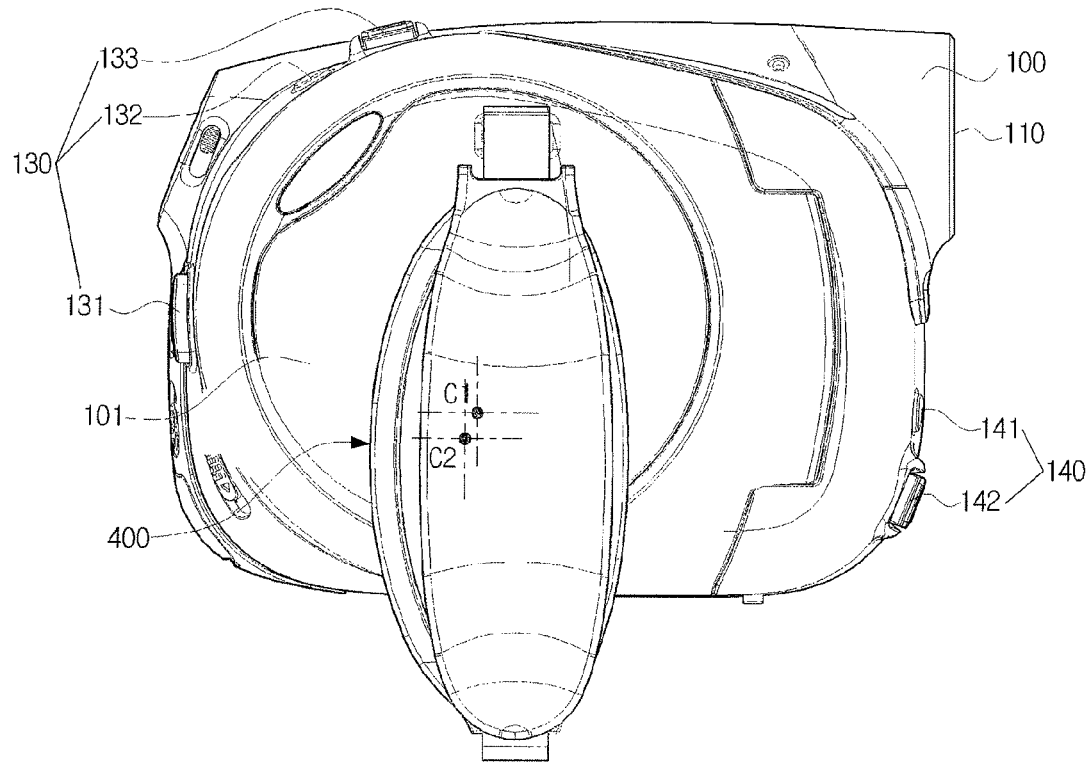
Figure 11C:
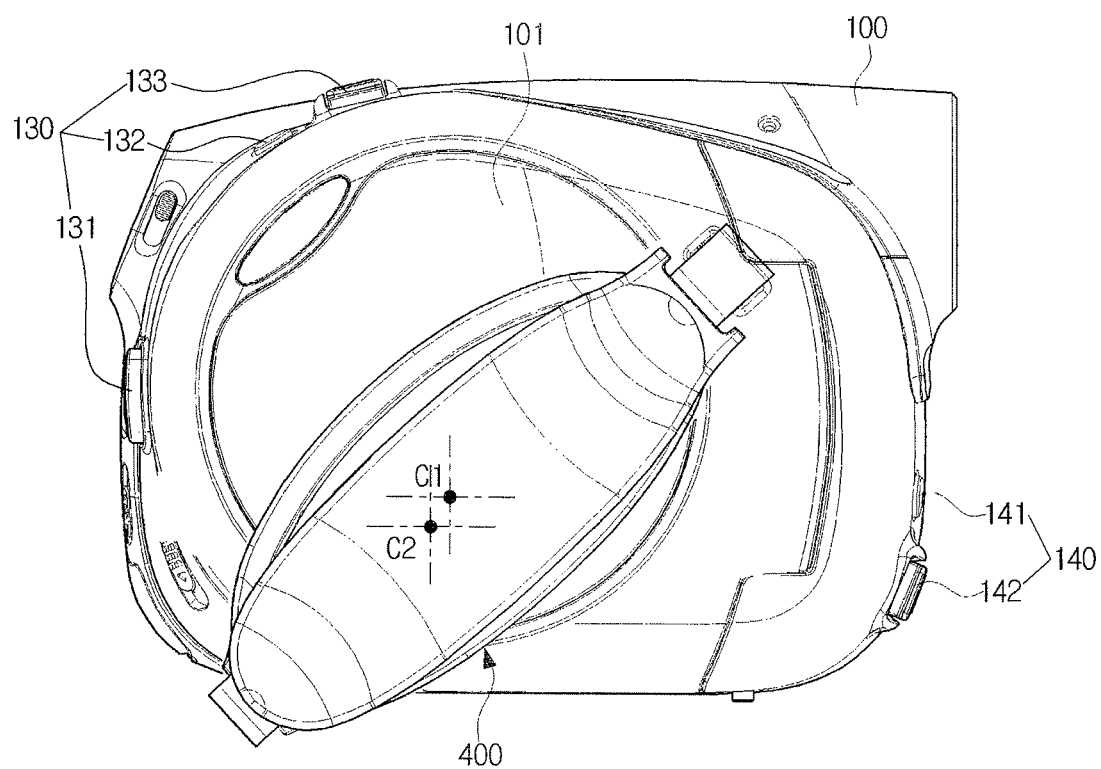

Referring to FIGS. 11A, 11B and 11C, the rotational center C1 of the rotation unit 400 lies eccentric relative to the geometrical center C2 of the rotation unit toward the rear side of the main body 100 where the user holds the main body 100. The geometrical center C2 of the rotation unit 400 is positioned lower than the geometrical center of the main body 100, and the actual rotational center C1 of the rotation unit 400 lies approximately between the geometrical centers of the main body 100 and the rotation unit 400.

The rotational center C1 of the rotation unit 400 takes into account the user's ability to manipulate the main body 100 when the rotation unit 400 rotates between the first and second positions.

Referring to FIG. 11A, in this exemplary embodiment of the present general inventive concept, a length L1 of the rotation unit 400 is approximately 80~100 mm, and lengths L2 and L3 are approximately 44~55 mm and 53~59 m, respectively. The lengths L1, L2 and L3 take into account the average length of the user's thumb and forefinger since they relate to the user's ability to manipulate the video capturing button 131 and still image button 132 and first zoom button 133 of the first button part 130 while the user is holding the rotation unit 400. Accordingly, the rotational center C1 of the rotation unit 400 may be positioned away from the rear side of the main body 100 and toward the front side by approximately 44~55 mm, and away from the upper side of the main body 100 and toward the lower side by approximately 53~59 mm.

In this way, the user may more easily manipulate the buttons of the button unit 120 of the main body 100 while holding the rotation unit 400.

While the position of the rotational center C1 and the rotation angle of the rotation unit 400 take into account the size of an average adult's hand 1 and the length L1 of the rotation unit 400, the present general inventive concept is not limited thereby, and the position of the rotational center C1 and the rotation angle may vary by considering the hand size and the size of the main body 100 and/or the rotation unit 400.

Figure 8:
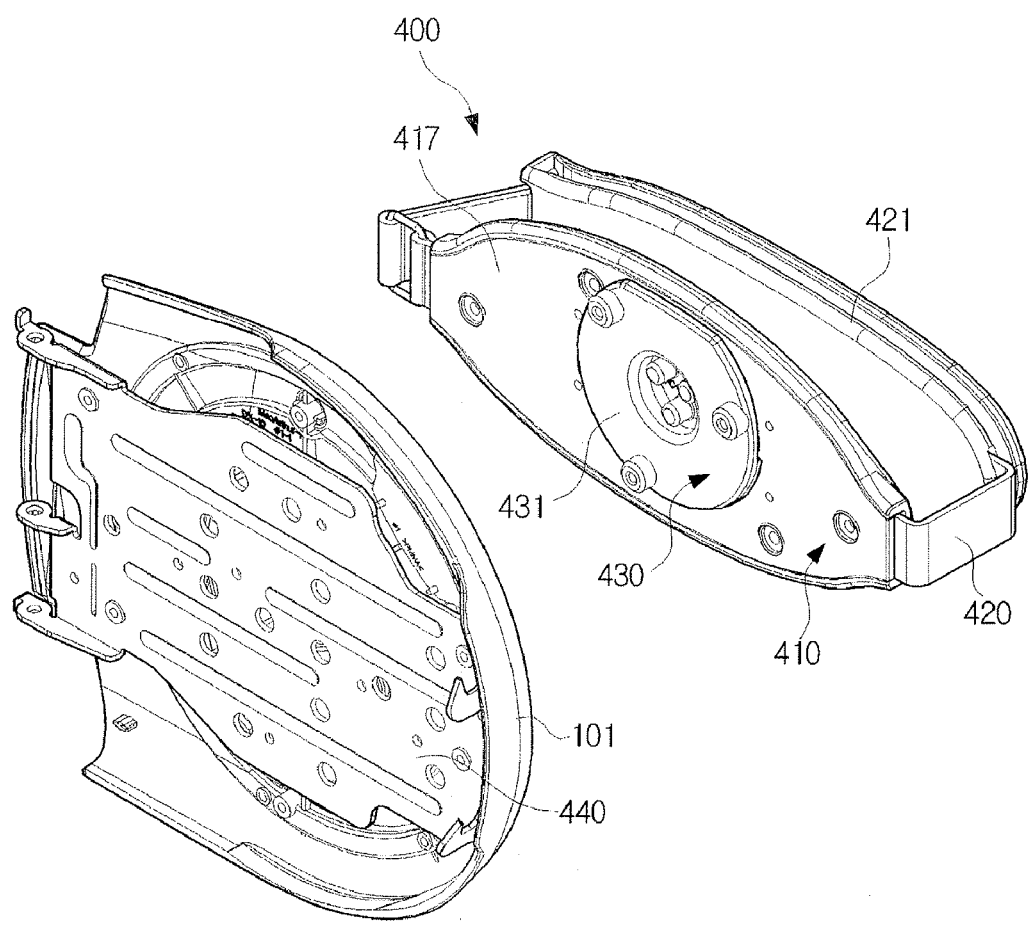
FIG. 8 is a simplified perspective view illustrating the rotation unit of FIG. 6 detached from a main body.
Figure 9A:
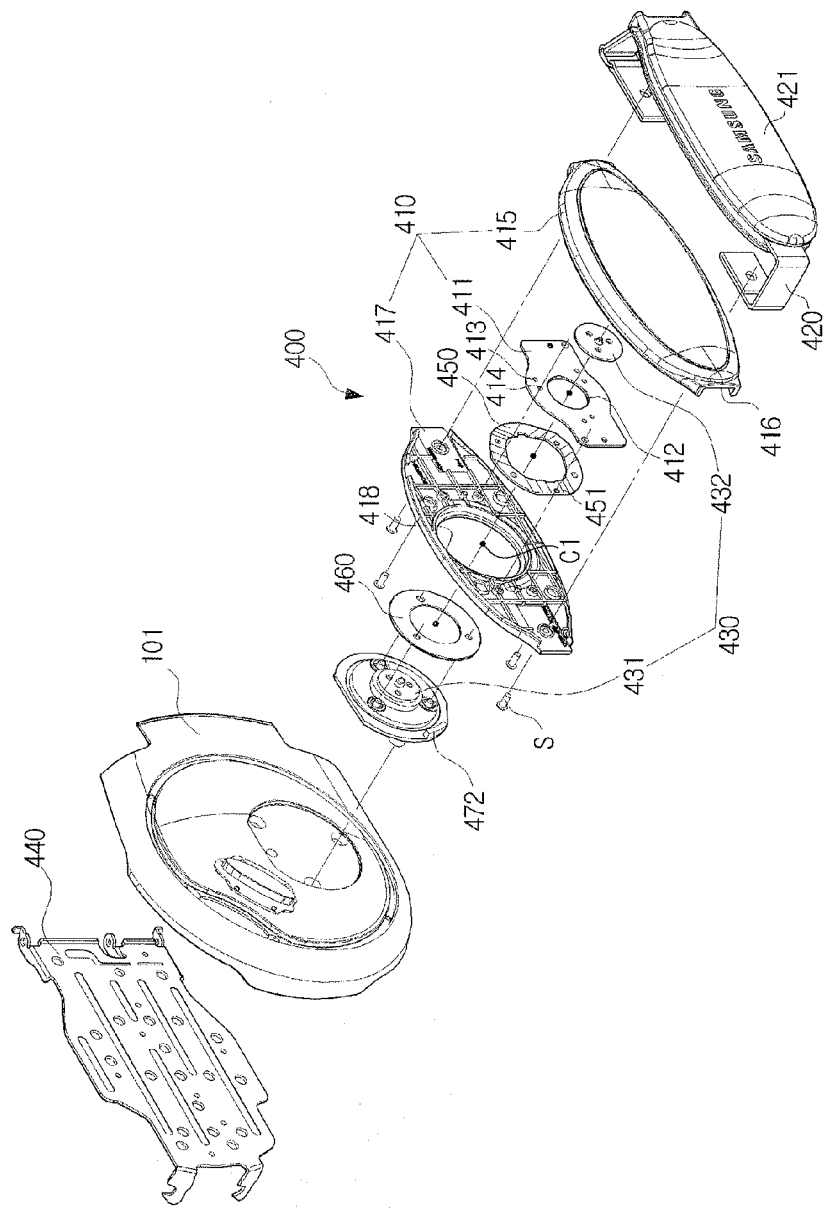
FIGS. 9A and 9B are simplified perspective views illustrating the rotation unit of FIG. 8.
Figure 9B:
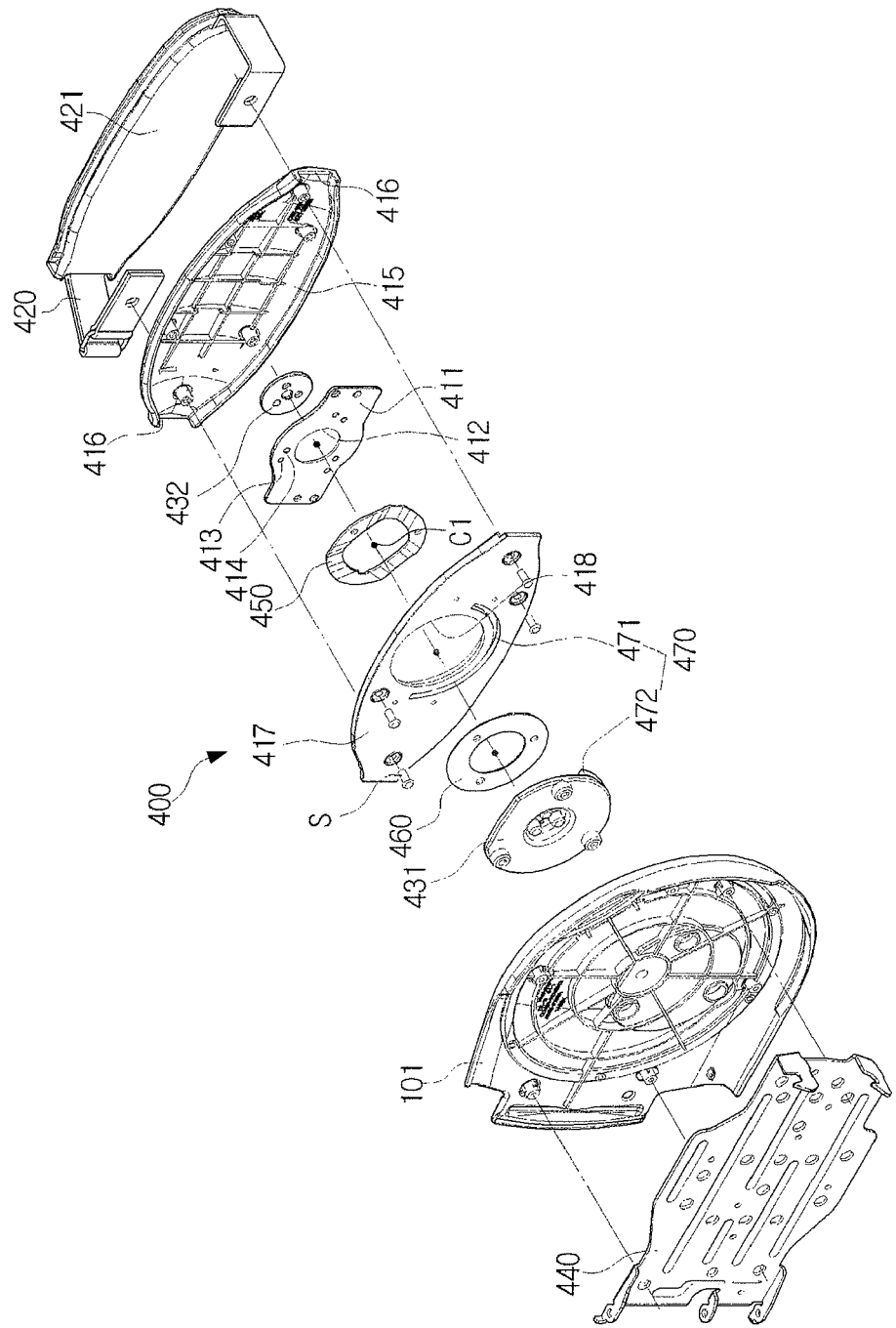

Referring now to FIGS. 8, 9A and 9B, the rotation unit 400 comprises a rotation part 410, a connection part 430, a reinforcing bracket 440, an elastic member 450, a sub-member 460, and a stopper unit 470.

The rotation part 410 rotates based on the rotational center C1 of the rotation unit 400. The rotation part 410 comprises a rotation member 411, a first rotation casing 415, and a second rotation casing 417.

The rotation member 411 rotates based on the rotational center C1 of the rotation unit 400. A first mounting hole 412 may be formed in the rotational center C1 of the rotation member 411 to receive the connection part 430.

The first and second rotation casings 415 and 417 may be installed with screws S so as to face each other based on the rotation member 411, thus forming exterior surfaces of the rotation unit 400.

The first rotation casing 415 and the main body 100 may be contoured to provide a comfortable ergonomic contact fit with the user's palm when the user grips the rotation unit 400.

A grip band 420 may be installed on the first rotation casing 415 by forming a band insertion groove 416 at both ends of the first rotation casing 415, and then inserting both ends of the group band 420 thereto. The inflection point of the first rotation casing 415 may be configured to match the center of the grip band 420 to enhance the user's gripping. The grip band 420 may also comprise an auxiliary member 421 to wrap the back of the hand for a more secure grip.

A first side of the second rotation casing 417 faces the disc cover 101. A second mounting hole 418 through which the connection part 430 may be mounted penetrates through the second rotation casing 417 as illustrated in FIG. 9A.

The rotation power of the rotation part 410 may be supplied by the user while gripping the main body 100 or the rotation unit 400. If the user grips the rotation unit 400 and rotates the rotation unit 400 in relation to the main body 100, or if the user rotates the main body 100 in relation to the rotation unit 400 while holding the main body 100, the rotation part 410 rotates between the first position and the second position.

Referring to FIG. 9A, the connection part 430 comprises a first connecting member 431 and a second connecting member 432 to connect the rotation part 410 to the main body 100.

Referring again to FIGS. 9A and 9B, the first and second connecting members 431 and 432 may be coupled through the first mounting hole 412 of the rotation member 411 and then coupled to the disc cover 101 of the main body 100 through the second mounting hole 418 of the second rotation casing 417. For doing so, the external diameter of the first and second connecting members 431 and 432 may be greater than that of the first and second mounting holes 418, respectively.

The reinforcing bracket 440 may be coupled with the first connecting member 431 of the connection part 430 through mounting holes in the disc cover 101 as illustrated in FIGS. 8, 9A and 9B. The reinforcing bracket 440 may be installed in the inner side of the disc cover 101 to reinforce the strength of the disc cover 101 (which may be comprised of a molded material) when the connection part 430 is mounted to the disc cover 101. As a result, the reinforcing bracket 440 may be formed of a material having high strength, for example, a metal material.

The elastic member 450 may be interposed between the connecting member 431 and the rotation member 411 to generate a friction torque when the rotation part 410 rotates.

A positioning protrusion 451 projects from the elastic member 450 and cooperates with positioning grooves 413 and 414 penetrating the rotation member 411 to produce a click touch when the rotation unit 400 rotates.

Figure 9C:
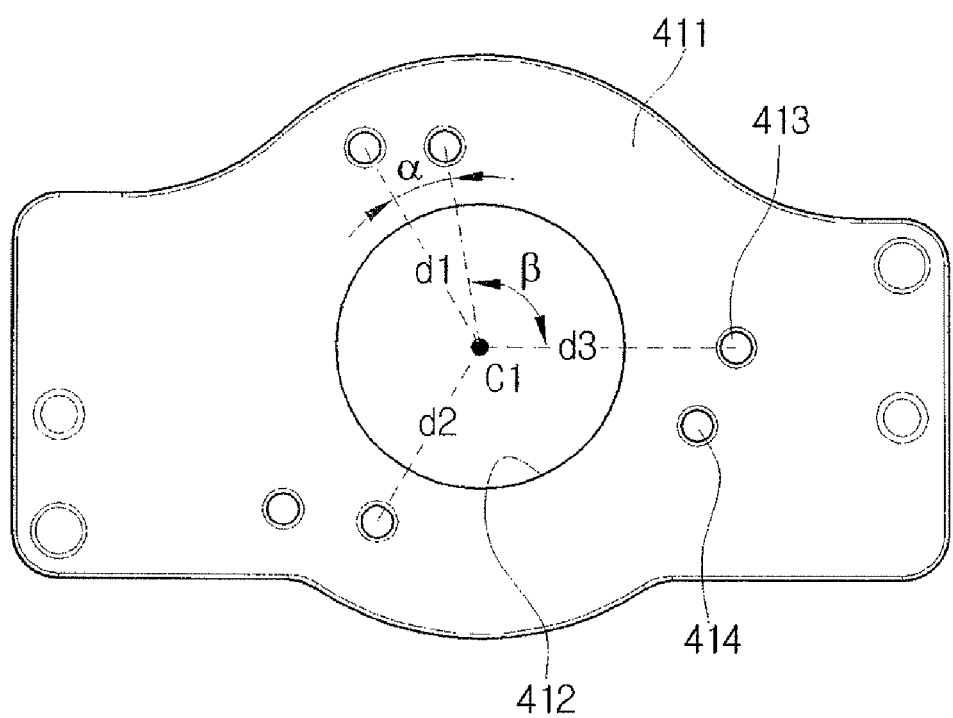
FIG. 9C is a simplified plane view illustrating the rotation unit of FIGS. 9A and 9B.

As illustrated in FIG. 9C, a plurality of the positioning grooves 413 and 414 may be configured to penetrate at least three areas of the rotation member 411, but it is understood that more or less areas may be penetrated without departing from the broader scope of the present general inventive concept.

As illustrated in FIG. 9C, the positioning grooves 413 and 414 comprise at least one pair of first positioning grooves 413 spaced apart at an interval of approximately $140°(\beta)$, and at least one pair of second positioning grooves 414 spaced apart from the first positioning grooves 413 by an interval of approximately $10°(\alpha)$. The interval of the second positioning grooves 414 is also approximately $140°$.

Referring again to FIG. 9C, the interval (a) between the first and second positioning grooves 413 and 414 may be approximately $10°$ to enable high angle shots at various angles according to the choice of the user. In this exemplary embodiment of the present general inventive concept, the number of the first and second positioning grooves 413 and 414 is three respectively, although more or less positioning grooves may be used without departing from the broader scope of the present general inventive concept.

In FIG. 9C, the positioning grooves 413 and 414 may be disposed at different radial lengths d1, d2 and d3 from the rotational center C1 of the rotation member 411. Hence, the positioning grooves 413 and 414 which are formed in three areas may be spaced apart by $140°$, rather than by $120°$, along the rotation radiuses d1, d2 and d3 relative to the rotational center C1 of the rotation member 411.

The positioning protrusion 451 may be selectively inserted into the first and second positioning grooves 413 and 414. In this exemplary embodiment of the present general inventive concept, three positioning protrusions 451 project from the elastic member 450 in accordance with the first and second positioning grooves 413 and 414 formed in the three areas of the rotation member 411.

The interval between the positioning protrusions 451 may be configured to correspond with the rotation angle $140°$ of the first and second positions. Similar to the first and second positioning grooves 413 and 414, the positioning protrusions 451 are disposed at different radial lengths relative to the rotational center C1 of the rotation member 411 so as to cooperate with the first and second positioning grooves 413 and 414, respectively.

While the configuration illustrated in FIG. 9C includes specific numbers of first and second positioning grooves and corresponding numbers of positioning protrusions 451, the present general inventive concept is not limited to those numbers. It is understood that two or more first and second positioning grooves 413 and 414 and two or more positioning protrusions 451 may be formed corresponding to the first and second positions.

Referring again to FIGS. 9A and 9B, a sub-member 460 may be disposed between the elastic member 450 and the first connecting member 431 to minimize the abrasion of the connecting member 431 due to the elasticity of the elastic member 450.

Figure 10A:
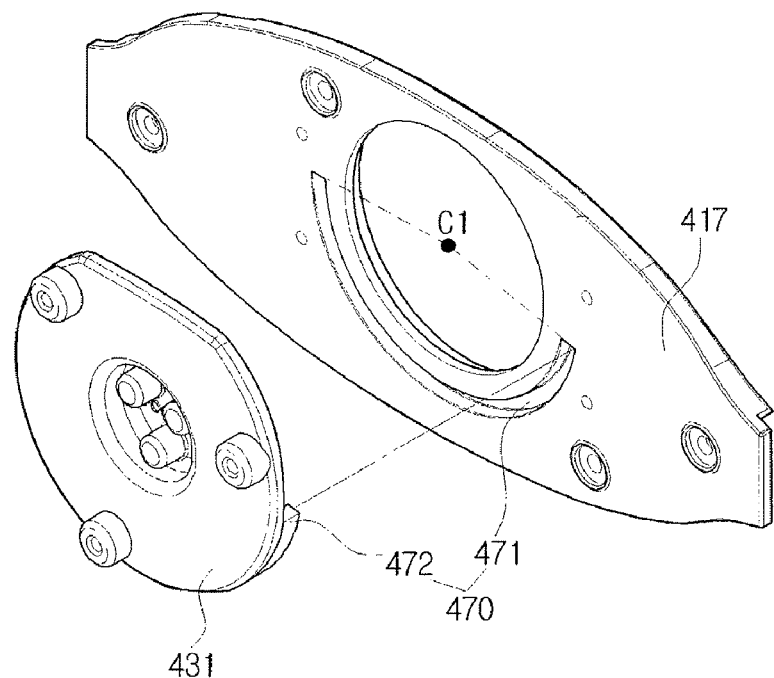
FIGS. 10A and 10B are simplified perspective views illustrating a stopper unit.
Figure 10B:
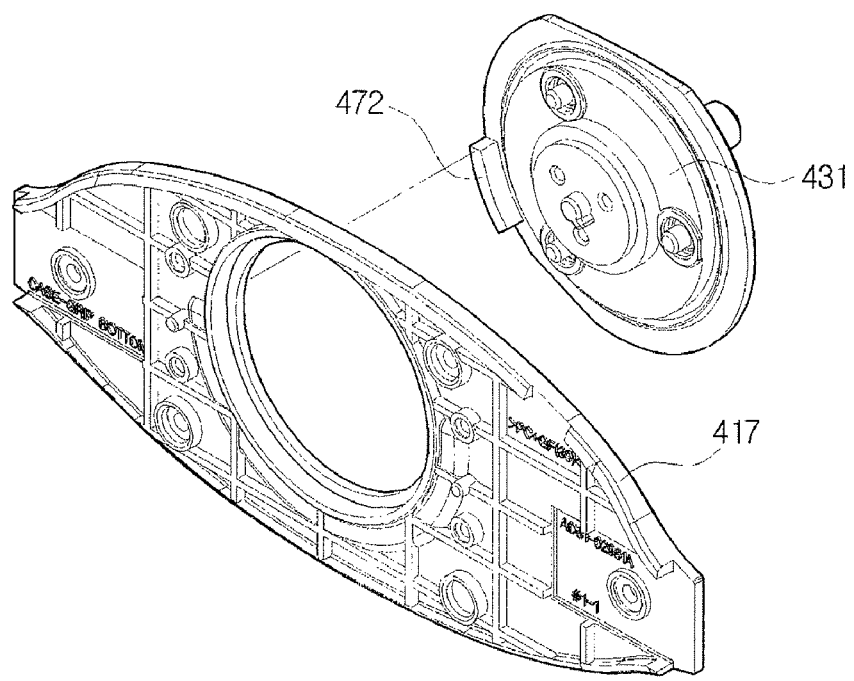

Referring to FIGS. 10A and 10B, a stopper unit 470 comprising a stopper rail 471 and a stopper protrusion 472 may be provided to restrict the rotation range of the rotation part 410 with respect to the main body 100.

The stopper rail 471 may be disposed on the second rotation casing 417 with a rotational radius of approximately 140° relative to the rotational center C1 of the rotation part 410. The stopper rail 471 may be positioned to correspond to the external diameter of the first connecting member 431, and the stopper protrusion 472 may be configured to protrude along the circumference of the first connecting member 431 for insertion into the stopper rail 471.

While the stopper unit 470 illustrated in FIGS. 10A and 10B comprises a stopper rail 471 and stopper protrusion 472 received therein, the present general inventive concept is not limited to these components. For example, the stopper unit 470 may comprise stopper protrusions formed in the rotation part 410 and connection part 430 respectively.

As illustrated in FIGS. 6 and 11A through 12B, a holding part 180 may be formed in the upper side of the main body 100 to receive the user's hand when holding the rotation unit 400.

Figure 12A:
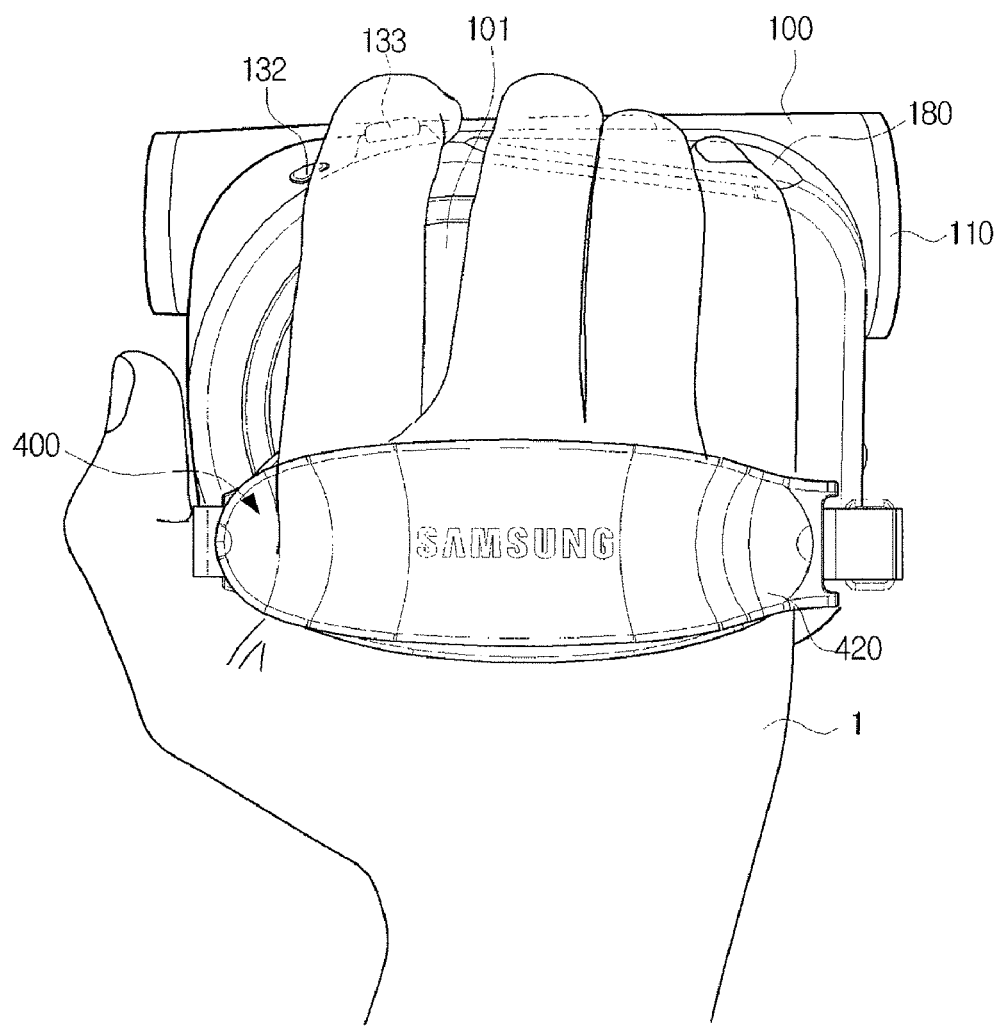
FIGS. 12A and 12B are simplified views illustrating the grip position of the rotation unit according to the angle shot of the image photography apparatus according to the third exemplary embodiment of the present general inventive concept.
Figure 12B:
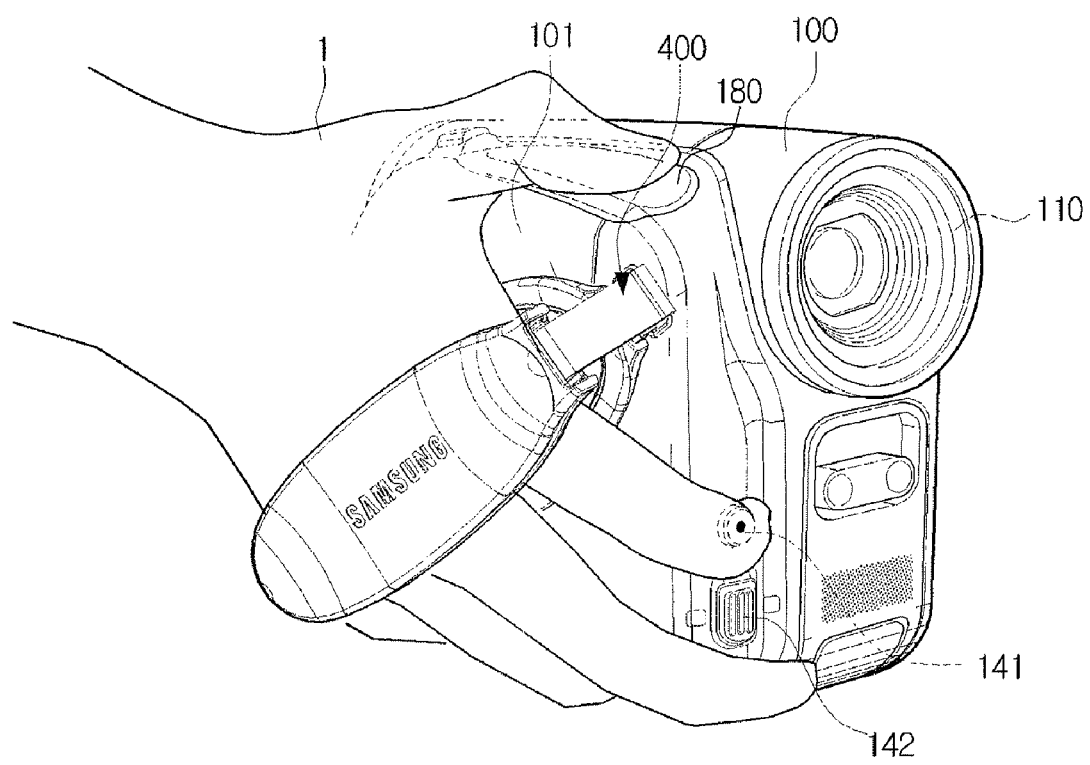

Referring to FIG. 12A, when the rotation unit 400 is positioned at the first position, the holding part 180 receives the middle finger, the ring finger, and the little finger of the user. However, as illustrated in FIG. 12B, when the rotation unit 400 is rotated to the second position, the holding part 180 receives the thumb of the user.

In this way, the holding part 180 enables the user to hold the main body 100 more comfortably. In addition, the holding part 180 restrains the user's hand 1 from slipping from the main body 100 while the user is gripping the rotation unit 400.

The gripping operation of the image photography apparatus as constructed above may be further explained with reference to FIGS. 6A through 12B.

To capture an image of an object at a high shot angle, a user holds the main body 100 by gripping the rotation unit 400 at the first position with respect to the main body 100 as illustrated in FIGS. 11A and 12A.

For high angle shots, the middle finger, the ring finger, and the littler finger of the user are received on the holding part 180 of the main body 100, enabling the user to manipulate the first button part 130 formed in the rear side and the upper side of the main body 100 with the thumb and the forefinger as illustrated in FIG. 12A.

Even when the user rotates the rotation unit 400 at the first position by approximately 10° or so, the user may still capture high angle shots of an object with the first position. However, when the user rotates the rotation unit 400 relative to the rotational center C1 while gripping the rotation unit 400, the positioning protrusion 451 escapes from the first positioning groove 413 and then is inserted to the second positioning groove 414 as described above with reference to FIGS. 9A, 9B and 9C.

Afterwards, to capture an object at a low shot angle, the user rotates the rotation unit 400 by 140° to the second position while gripping the rotation unit 400 as shown in FIG. 12B. Since the rotational center C1 of the rotation unit 400 does not coincide with the geometrical center C2 of the rotation unit 400, the rotation unit 400 is eccentrically rotated as illustrated in FIG. 11B.

When the rotation unit 400 is rotated from the first position to the second position, the rotation range may be limited by the stopper unit 470. Furthermore, a click touch may be produced by the interaction of the positioning protrusions 451 and the first positioning grooves 413 as described above.

Since the stopper protrusion 472 projecting from the first connecting member 431 may be inserted into the stopper rail 471 of the second rotation casing 417 as illustrated in FIGS. 9A through 10B, the rotation range of the rotation member 411 may be restricted to a suitable rotational range, for example to approximately 140°.

When the user rotates the rotation unit 400 between the first and second positions, and the positioning protrusion 451 projecting from the elastic member 450 escapes the first positioning groove 413 and becomes inserted into another first positioning groove 413 spaced approximately 140° apart, a click touch is provided to the user. At this time, when the rotation member 411 rotates, the elastic member 450 interposed between the first connecting member 431 and the rotation member 411 produces a friction torque. Any abrasion of the first connecting member 431 which may be caused by the elasticity of the elastic member 450 may be minimized by the sub-member 460.

As illustrated in FIG. 12B, when the rotation unit 400 is rotated to the second position, the user holds the main body 100 such that the thumb is put on the holding part 180 and the middle finger, the ring finger, and the little finger support the bottom of the main body 100 In this position, the user may input manipulation signals by manipulating the second button part 140 formed in the front side of the main body 100 with the fingers.

FIG. 13 illustrates an internal block diagram of a digital camcorder according to an exemplary embodiment of the present general inventive concept.

The image photography apparatus according to the first, second and third exemplary embodiments of the present general inventive concept comprises a capturing part 510, a first memory 520, a video input part 525, a Digital Signal Processor (DSP) 530, a controller 535, a button unit 120, a second memory 545, a back-end part 550, a USB interface 555, a video output part 560, an audio processor 565, a multi-Liquid Crystal Display (LCD) 570, an Electrically Erasable and Programmable Read Only Memory (EEPROM) 580, and a recording part 590.

The capturing part 510 photo-electrically converts incident light from a lens to an electrical signal and signal-processes the electrical signal. The capturing part 510 comprises a lens part 110, a Charge Coupled Device (CCD) 513, a Correlated Double Sampler (CDS)/Auto Gain Controller (AGC)/Analog-to-Digital Converter (ADC) 515, a CCD driving part 517, and a lens driving part 519.

The lens part 110 forms an optical image of the captured object on an optical surface of the CCD 513. The lens part 110 corresponds to the lens part 110 of FIG. 6.

The lens driving part 519 drives the lens part 110 with a zoom-motor (not illustrated) to zoom the lens part 110 in and out. The driving part 519 also adjusts the focus of the lens part 110 by driving the lens part 110 with a focus-motor, and adjusts the opening of iris diaphragm (not illustrated) of the lens part 110 by driving the lens part 110 with an iris-motor.

The CCD 513 may be driven by the CCD driving part 517 to generate and output an electrical signal corresponding to the optical image formed in the optical surface by the lens part 110.

The CDS/AGC/ADC 515 performs processing operations such as correlated double sampling, auto gain controlling, and A/D conversion with respect to the electrical signal fed from the CCD 513.

The first memory 520 provides a memory buffer to serve as a recording area when the DSP 530 signal processes the video signal. The first memory 520 may be implemented in the form of a flash memory and/or Synchronous Dynamic Random Access Memory (SDRAM), although other types of memory configurations may be used without departing from the scope of the present general inventive concept.

The video input part 525 receives video signals from an external device and provides the input video to the DSP 530 and/or the back-end part 550.

The DSP 530 signal-processes the video signal fed from the lens part 110 or the video input part 525 and outputs the processed video signal to the back-end part 550. When processing the signal, the DSP 530 uses the first memory 520 as a memory buffer.

The DSP 530 converts the format of the video signal fed from the lens part 110, controls the digital zoom to adjust the video scale, controls Auto White Balance (AWB), and then outputs the processed video to the back-end part 550. The DSP 530 controls the lens driving part 517 for Auto Focus (AF) and Auto Exposure (AE).

The DSP 530 also compresses the video signal fed from the lens part 110 or the video input part 525 into a compression format suitable for still images, for example into a file of JPEG format, and outputs the compressed file to the back-end part 550. The DSP 530 uncompresses the JPEG file fed from the back-end part 550 and outputs the uncompressed file to the back-end part 550.

The controller 535 controls the signal processing/signal transfer operation of the DSP 530 and the signal processing/signal transfer operation of the back-end part 550 according to a user's manipulation command input through the button unit 120.

Referring to FIGS. 6 through 7C and 13, the button unit 120 comprises first and second button parts 130 and 140, a power button 150, and a mode change button 160.

The second memory 545 provides a memory buffer to serve as a recording area when the back-end part 550 processes the signal. The second memory 545 also contains graphics, menus, and texts enabling the back-end part 550 to process the On-Screen Display (OSD). The second memory 545 may be implemented using a flash memory and/or SDRAM, although as discussed above with respect to the first memory 520, other types of memory configurations may be used without departing from the scope of the present general inventive concept.

As discussed above, the back-end part 550 cooperates with the DSP 530 to perform signal processing operations such as compressing, uncompressing, and reproducing of the video and/or audio signals.

For example, the back-end part 550 encodes the video signal input from the DSP 530 into a format suitable for display and then outputs the encoded video signal to the multi-LCD 570 or the video output part 560.

The back-end part 550 performs OSD-processing operations so as to output graphics, menus, and texts with respect to the video input fed from the DSP 530. The graphics, menus, and texts recorded to the second memory 545 may be read by the back-end part 550 as OSD information. The back-end part 550 then utilizes this information to perform the OSD processing operations.

The back-end part 550 compresses the video signal fed from the DSP 530 and the audio signal fed from the audio processor 565, and then provides the generated compression file to the recording part 590.

The back-end part 550 restores the video signal and the audio signal by uncompressing the compression file input from the recording part 590, outputs the restored video signal to the multi-LCD 570, and then outputs the restored audio signal to the audio processor 565.

As the back-end part 550 outputs the restored video signal to the multi-LCD 570, the back-end part 550 performs OSD-processing operations with respect to the restored video.

Further, the back-end part 550 provides the JPEG file fed from the DSP 530 to the recording part 590 and provides the JPEG file fed from the recording part 590 to the DSP 530.

The USB interface 555 provides a USB communication interface between a USB device such as PC and printer, and the digital camcorder. The video output part 560 outputs the video signal provided from the back-end part 550 to a connected external device (e.g., TV).

The audio processor 565 converts an analog audio signal input through an audio input device such as microphone to a digital audio signal, and then provides the digital audio signal to the back-end part 550. The audio processor 565 then converts the digital audio signal fed from the back-end part 550 to an analog audio signal and outputs the analog audio signal to a speaker and/or other connected external device.

The multi-LCD 570 displays the video output from the back-end part 550 on the LCD display element. The multi-LCD 570 comprises a main LCD 573 driven by a main LCD driving part 571 to display video, and a sub-LCD 577 driven by a sub-LCD driving part 575 to display video.

The main LCD 573 corresponds to the display part 170 of FIG. 6 and the sub-LCD 577 corresponds to a reference number 175 of FIG. 6. The sub-LCD 175 may be smaller in size than the main LCD 170. The video displayed in the main LCD 573 may be the same as or different from the video displayed in the sub-LCD 577.

The EEPROM 580 provides a memory area containing programs and data enabling the back-end part 550 to process and transfer the signals.

The recording part 590 comprises a disc loader 591, a memory card interface 593, a multi-slot 595, a memory controller 597, and a flash memory 599 to record the compression file output from the back-end part 550 to a recording medium.

The disc loader 591 may be embedded in the disc cover 101 of FIG. 6. The disc loader 591 records the compression file input from the back-end part 550 to a mounted disc. The disc loader 591 reads a compression file recorded to the mounted disc and outputs the read compression file to the back-end part 550. The disc may be a Compact Disk (CD), Digital Versatile Disk (DVD), Blu-ray Disk (BD), High Definition (HD)-DVD, or other known or later developed recording media.

The memory card interface 593 records the compression file input from the back-end part 550 to various types of suitable memory cards which may be inserted into the multi-slot 595. The multi-slot 595 may be formed in the rear side within the main body 100.

The memory card interface 593 reads a compression file recorded to the inserted memory card and outputs the read compression file to the back-end part 550. The memory card may employ MultiMediaCard (MMC), Secure Digital (SD)

card, or other known or later developed types of memory cards without departing from the scope of the present general inventive concept.

The memory controller 597 records the compression file input from the back-end part 550 to the built-in flash memory 599. The memory controller 597 reads the compression file recorded to the flash memory 599 and outputs the read compression file to the back-end part 550.

The controller 535 controls the back-end part 550 and the recording part 590 to record the compression file output from the back-end part 550 to the disc, memory card, and flash memory 599. The user can select the recording medium using a menu provided by the back-end part 550 through the OSD processing.

The controller 535 controls the copy and transfer of files between the recording media embedded/mounted to the recording part 590. For example, in the exemplary embodiments of the present general inventive concept, the controller 535 controls at least the following copy operations: (1) to copy the file recorded to the flash memory 599 to the disc or the memory card, (2) to copy the file recorded to the memory card to the disc or the flash memory 599, and (3) to copy the file recorded to the disc to the memory card or the flash memory 599. The user may select the desired copy type using the menu provided by the back-end part 550 through the OSD processing.

With respect to the first copy operation, the file recorded to the flash memory 599 and read by the memory controller 597 may be copied (a) to the disc through the back-end part 550 and the disc loader 591, or (b) to the memory card through the back-end part 550 and the memory card interface 593.

With respect to the second copy operation, the file recorded to the memory card and read by the memory card interface 593 through the multi-slot 595 may be copied (a) to the disc through the back-end part 550 and the disc loader 591, or (b) to the flash memory 599 through the back-end part 550 and the memory controller 597.

With respect to the third copy operation, the file recorded to the disc and read by the disc loader 591 through may be copied (a) to the memory card through the back-end part 550 and the memory card interface 593, or (b) to the flash memory 599 through the back-end part 550 and the memory controller 597.

As mentioned above, the main LCD 573 and the sub-LCD 577 of the digital camcorder may display the same or different videos.

The video displayed in the main LCD 573 and the sub-LCD 577 may be determined by a specific-mode of the digital camcorder. In the exemplary embodiments of the present general inventive concept, the specific-mode may comprise a child-mode, an adult-mode, a saving-mode, and a normal-mode. The user can select the specific-mode using the menu provided by the back-end part 550 through the OSD processing.

The child-mode, which may be configured to capture a child, uses both the main LCD 573 and the sub-LCD 577. The adult-mode, which may be configured to capture a grown-up, also uses both the main LCD 573 and the sub-LCD 577.

The saving-mode, which may be configured to capture an object with minimized power consumption, uses only the sub-LCD 577. The normal-mode, which may be configured for normal image capturing, uses only the main LCD 573.

As set forth above, the user may capture images at his/her intended angle by freely changing the position of the hand while holding the image photography apparatus. In addition, the exemplary embodiments of the present general inventive concept enhance close contact between the main body and the hand. When the image photography apparatus is not in use, the user may easily carry the image photography apparatus by folding the hand grip to prevent the hand grip from dangling from the main body.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image photography apparatus comprising:
    a main body; and
    a rotation unit rotatably installed on the main body and formed with a grip to rotate with respect to the main body,
    wherein the rotation unit comprises:
        a first member protruding and rotatably installed on one side of the main body, and
        a second member fixed to the first member substantially perpendicularly thereto,
        wherein a length of the first member is adjustable lengthwise.

2. The image photography apparatus of claim 1, wherein the rotation unit further comprises:
    a rotation plate rotatably installed on one side of the main body,
    wherein the first member is rotatably hinged to the rotation plate, and
    the second member is hinged to the first member to rotate substantially perpendicularly thereto.

3. The image photography apparatus of claim 1, wherein a disc cover having an open and closed position is installed on one side of the main body for inserting and extracting a recording medium, and
    the rotation unit is installed to the disc cover.

4. The image photography apparatus of claim 1, wherein the main body comprises:
    a button unit including first and second button parts to input the same manipulation signal at different places.

5. The image photography apparatus of claim 1, wherein a holding part to guide the holding of the main body is formed on an upper side of the main body.

6. An image photography apparatus comprising:
    a main body; and
    a rotation unit rotatably installed on the main body and formed with a grip to rotate with respect to the main body,
    wherein the rotation unit comprises:
        a rotation part installed to the main body;
        a connection part rotatably connecting the rotation part to the main body; and
        a grip band coupled to the rotation part,
        wherein a rotational center of the rotation part is eccentric from a geometrical center of the rotation part.

7. The image photography apparatus of claim 6, wherein the rotation part is rotatable between at least two positions spaced apart by approximately 0~140°.

8. The image photography apparatus of claim 6, wherein the rotational center of the rotation part lies between a geometrical center of the main body and the geometrical center of the rotation part.

9. The image photography apparatus of claim 8, wherein the rotational center of the rotation part is spaced apart from a rear side of the main body, which faces the user, to a front side of the main body by approximately 45~55 mm.

10. The image photography apparatus of claim 9, wherein rotation part comprises:
   a rotation member; and
   first and second rotation casings to wrap the rotation member.

11. The image photography apparatus of claim 10, wherein the connection part comprises:
   a first connecting member to connect the rotation part to the main body; and
   a second connecting member to connect the rotation member to the first connecting member.

12. The image photography apparatus of claim 11, wherein a mounting hole for mounting the first connecting member is formed on the second rotation casing.

13. The image photography apparatus of claim 11, wherein a reinforcing bracket connected to the first connecting member is installed in an inner side of the main body.

14. The image photography apparatus of claim 11, wherein the rotation unit comprises:
   an elastic member installed between the rotation member and the first connecting member to generate a friction torque.

15. The image photography apparatus of claim 14, wherein the rotation unit further comprises:
   a sub-member installed between the first connecting member and the elastic member to minimize abrasion of the first connecting member due to elasticity of the elastic member.

16. The image photography apparatus of claim 14, wherein a plurality of positioning grooves is formed on the rotation member to correspond to the at least two positions of the rotation member, and
   a positioning protrusion inserted into the positioning grooves protrudes from the elastic member.

17. The image photography apparatus of claim 16, wherein an interval of the positioning grooves is approximately 140°.

18. The image photography apparatus of claim 17, wherein the positioning grooves have different radiuses as measured from the rotational center of the rotation member.

19. The image photography apparatus of claim 18, wherein the positioning grooves comprise:
   at least one pair of first positioning grooves spaced apart at intervals of approximately 140°; and
   at least one pair of second positioning grooves spaced apart from the first positioning grooves by approximately 10°.

20. The image photography apparatus of claim 11, wherein the rotation unit comprises:
   a stopper unit to restrict a rotation range of the rotation part with respect to the main body.

21. The image photography apparatus of claim 20, wherein the stopper unit comprises:
   a stopper rail disposed in the second rotation casing with a rotational radius of approximately 140° based on the rotational center of the rotation part; and
   a stopper protrusion protruding from the first connecting member to be inserted into the stopper rail.

22. The image photography apparatus of claim 10, wherein the grip band is installed on the first rotation casing.

23. An image photography apparatus comprises:
   a main body comprising a lens part for capturing an object and a disc loader for recording the captured image from the lens part; and
   a rotation unit installed on the main body with a grip to rotate with respect to the main body,
   wherein the rotation unit comprises:
      a first member protruding and rotatably installed on the main body, and
      a second member fixed to the first member substantially perpendicularly thereto,
      wherein a length of the first member is adjustable lengthwise.

24. The image photography apparatus of claim 23, wherein the rotation unit further comprises:
   a rotation plate rotatably installed on the main body,
   wherein the first member is rotatably hinged to the rotation plate, and
   the second member is hinged to the first member to rotate substantially perpendicularly thereto.

25. The image photography apparatus of claim 23, wherein the main body comprises:
   a button unit including first and second button parts to input the same manipulation signal at different places.

26. The image photography apparatus of claim 23, wherein a holding part to guide the holding of the main body is formed on an upper side of the main body.

27. The image photography apparatus of claim 23, wherein a display part having an open and closed position for displaying a video captured by the lens part is installed on another side of the main body.

28. An image photography apparatus comprising:
   a main body comprising a lens part to capture an object and a disc loader to record the captured image from the lens part; and
   a rotation unit installed on the main body with a grip to rotate with respect to the main body,
   wherein the rotation unit comprises:
      a rotation part installed on the main body,
      a connection part rotatably connecting the rotation part to the main body, and
      a grip band coupled to the rotation part,
      wherein a rotational center of the rotation part is eccentric from a geometrical center of the rotation part.

29. The image photography apparatus of claim 28, wherein the rotation part is rotatable between at least two positions spaced apart by approximately 0~140°.

30. The image photography apparatus of claim 28, wherein the rotational center of the rotation part lies between a geometrical center of the main body and the geometrical center of the rotation part.

31. The image photography apparatus of claim 30, wherein the rotational center of the rotation part is spaced apart from a rear side of the main body, which faces the user, to a front side of the main body by approximately 45~55 mm.

32. The image photography apparatus of claim 31, wherein the rotation part comprises:
   a rotation member; and
   first and second rotation casings to wrap the rotation member.

33. The image photography apparatus of claim 32, wherein the connection part comprises:
   a first connecting member to connect the rotation part to the main body; and
   a second connecting member to connect the rotation member to the first connecting member.

34. The image photography apparatus of claim 33, wherein a mounting hole for mounting the first connecting member is formed on the second rotation casing.

35. The image photography apparatus of claim 33, wherein a reinforcing bracket connected to the first connecting member is installed on an inner side of the main body.

36. The image photography apparatus of claim 33, wherein the rotation unit comprises:
an elastic member installed between the rotation member and the first connecting member to generate a friction torque.

37. The image photography apparatus of claim 36, wherein the rotation unit further comprises:
a sub-member installed between the first connecting member and the elastic member to minimize abrasion of the first connecting member due to elasticity of the elastic member.

38. The image photography apparatus of claim 36, wherein a plurality of positioning grooves is formed on the rotation member to correspond to the at least two positions of the rotation member, and
a positioning protrusion inserted into the positioning groove protrudes from the elastic member.

39. The image photography apparatus of claim 38, wherein an interval of the positioning grooves is approximately 140°.

40. The image photography apparatus of claim 39, wherein the positioning grooves have different radiuses as measured from the rotational center of the rotation member.

41. The image photography apparatus of claim 40, wherein the positioning grooves comprise:
at least one pair of first positioning grooves spaced apart at intervals of approximately 140°; and
at least one pair of second positioning grooves spaced apart from the first positioning grooves by approximately 10°.

42. The image photography apparatus of claim 33, wherein the rotation unit comprises:
a stopper unit to restrict a rotation range of the rotation part with respect to the main body.

43. The image photography apparatus of claim 42, wherein the stopper unit comprises:
a stopper rail disposed in the second rotation casing with a rotational radius of approximately 140° based on the rotational center of the rotation part; and
a stopper protrusion protruding from the first connecting member to be inserted into the stopper rail.

44. The image photography apparatus of claim 32, wherein the grip band is installed on the first rotation casing.

45. An image photography apparatus comprising:
a main body comprising a lens part installed on a front side of the main body to capture an object, and a recording medium driving part to drive a recording medium so as to record a video captured by the lens part;
a display part installed on one side of the main body to display the video; and
a rotation member rotatably installed on the main body and formed with a grip to rotate with respect to the main body,
wherein a rotational center of the rotation member is eccentric from a geometrical center of the rotation member.

46. The image photography apparatus of claim 45, wherein a rotational center of the rotation member is eccentric from a geometrical center of the main body toward a rear side of the main body.

47. The image photography apparatus of claim 45, wherein the rotation member is rotatably installed on a recording medium cover installed on another side of the main body, and a rotational center of the rotation member is eccentric from a geometrical center of the recording medium cover toward a rear side of the main body.

48. The image photography apparatus of claim 45, wherein the rotation member is rotatable between a first position for a high angle shot and a second position for a low angle shot.

49. The image photography apparatus of claim 48, wherein a rotation range of the first position is approximately 0~20°.

50. The image photography apparatus of claim 48, wherein a rotation range of the second position is approximately 130~170°.

51. The image photography apparatus of claim 48, wherein a holding part for guiding the holding of the main body is formed in an upper side of the main body.

52. The image photography apparatus of claim 51, wherein the holding part is inclined at a predetermined angle.

53. The image photography apparatus of claim 45, wherein the rotation unit may be folded toward the main body to prevent the rotation unit from dangling from the main body.

54. An image photography apparatus comprising:
a main body; and
a rotation unit rotatably installed on the main body and formed with a hand grip to rotate with respect to the main body, wherein the rotation unit may be rotated by a user's hand between a first position to capture high angle shots and a second position to capture low angle shots without removing the user's hand from the rotation unit,
wherein the rotation unit comprises:
a first member protruding and rotatably installed on one side of the main body, and
a second member fixed to the first member substantially perpendicularly thereto,
wherein a length of the first member is adjustable lengthwise.

55. A method of capturing images with an image photography apparatus having a rotation unit rotatably installed to a main body of the image photography apparatus, the method comprising:
gripping the rotation unit by a user's hand in a first position to capture high angle images;
rotating the rotation unit to a second position to capture low angle images without removing the user's hand from the rotation unit,
wherein the rotation unit comprises:
a first member protruding and rotatably installed on one side of the main body, and
a second member fixed to the first member substantially perpendicularly thereto,
wherein a length of the first member is adjustable lengthwise.

56. The method of claim 55, wherein the main body comprises a button unit including first and second button parts disposed on different sides of the main body, each button part being configured to input the same manipulation signals to the image photography apparatus, wherein the user's hand selectively operates the button unit in either the first or second position to input the same manipulation signals to the image photography apparatus from the first and second positions.

57. The method of claim 56, wherein the first and second button parts enable the user to selectively control modes of operation of the image photography apparatus from either the first or second position.

58. An image photography apparatus comprising:
a main body;
a rotation unit rotatably installed on the main body and formed with a hand grip to rotate with respect to the main body; and
a button unit including first and second button parts disposed on different sides of the main body, each button part being configured to input the same manipulation signals to the image photography apparatus;

wherein the rotation unit may be rotated by a user's hand between a first position and a second position without removing the user's hand from the rotation unit;

the user's hand selectively operates the button unit in either the first or second position to input the same manipulation signals to the image photography apparatus from the first and second positions; and the rotation unit comprises:
  a first member protruding and rotatably installed on one side of the main body, and
  a second member fixed to the first member substantially perpendicularly thereto,
  wherein a length of the first member is adjustable lengthwise.

59. The image photography apparatus of claim 58, wherein the rotation unit may be folded toward the main body to prevent the rotation unit from dangling from the main body.

* * * * *